(12) United States Patent
Aycock et al.

(10) Patent No.: US 10,615,582 B2
(45) Date of Patent: *Apr. 7, 2020

(54) IN-GROUND ENCLOSURE SYSTEM

(71) Applicant: BOBsBOX, LLC., Port St. Lucie, FL (US)

(72) Inventors: Kevin T. Aycock, Port St. Lucie, FL (US); Robert J. Schilling, Port St. Lucie, FL (US)

(73) Assignee: BOBSBOX, LLC., Port St. Lucie, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/164,036

(22) Filed: Oct. 18, 2018

(65) Prior Publication Data

US 2019/0052068 A1     Feb. 14, 2019

Related U.S. Application Data

(63) Continuation of application No. 15/694,186, filed on Sep. 1, 2017, now Pat. No. 10,141,730.

(Continued)

(51) Int. Cl.
*H02G 3/08*     (2006.01)
*H02G 3/03*     (2006.01)
(Continued)

(52) U.S. Cl.
CPC ............... *H02G 3/088* (2013.01); *H02B 1/28* (2013.01); *H02B 1/36* (2013.01); *H02B 1/48* (2013.01);
(Continued)

(58) Field of Classification Search
CPC .......... H02G 3/08; H02G 3/081; H02G 3/086; H02G 3/10; H02G 3/12; H02G 3/088;
(Continued)

(56) References Cited

U.S. PATENT DOCUMENTS 4,993,970 A    2/1991   Littrell
5,285,009 A    2/1994   Bowman et al.
(Continued)

FOREIGN PATENT DOCUMENTS

FR           2509343       1/1983
RU           2188910       9/2002
RU           132461        9/2013

*Primary Examiner* — Angel R Estrada
(74) *Attorney, Agent, or Firm* — Duane Morris LLP; J. Rodman Steele, Jr.; Gregory M. Lefkowitz

(57) ABSTRACT

An in-ground enclosure for housing electrical components is provided. The in-ground enclosure can include an outer shell, a first compartment located within the outer shell, a second compartment located within the outer shell, an upper panel comprising a first compartment opening for accessing the first compartment and a second compartment opening for accessing the second compartment, a dividing wall separating the first compartment from the second compartment, a first compartment cover adapted for removably sealing the first compartment opening, and a second compartment cover adapted for removably sealing the second compartment opening. A telecommunications base station is also provided. The telecommunications base station can include an in-ground enclosure and a cellular base station, which can include an antenna coupled to signal processing equipment and a power supply.

19 Claims, 20 Drawing Sheets

Related U.S. Application Data

(60) Provisional application No. 62/483,005, filed on Apr. 7, 2017.

(51) Int. Cl.
*H02B 1/36* (2006.01)
*H02B 1/56* (2006.01)
*H02B 1/48* (2006.01)
*H02B 1/50* (2006.01)
*H02B 1/28* (2006.01)
*H02G 9/10* (2006.01)

(52) U.S. Cl.
CPC .............. *H02B 1/505* (2013.01); *H02B 1/56* (2013.01); *H02G 3/03* (2013.01); *H02G 9/10* (2013.01)

(58) Field of Classification Search
CPC .. H02G 3/03; H02G 9/10; H05K 5/00; H05K 5/02; H02B 1/28; H02B 1/36; H02B 1/48; H02B 1/505; H02B 1/26; H02B 1/30; H02B 1/56

USPC ......... 174/50, 57, 58, 59, 520, 481, 482, 37, 174/559, 483, 486, 487, 490; 220/3.2–3.9, 4.02; 361/600, 601, 679.01
See application file for complete search history.

(56) References Cited

U.S. PATENT DOCUMENTS

| | | |
|---|---|---|
| 5,796,037 A | 8/1998 | Young et al. |
| 6,274,809 B1 | 8/2001 | Pudims et al. |
| 7,513,385 B2 | 4/2009 | Flynn |
| 7,751,179 B2 | 7/2010 | Irmer et al. |
| 8,366,118 B2 | 2/2013 | Schilling |
| 8,367,232 B2 | 2/2013 | Schilling |
| 8,519,263 B2 | 8/2013 | Schilling |
| 8,519,276 B2 | 8/2013 | Isaacks et al. |
| 8,813,916 B2 | 8/2014 | Schilling |
| 10,141,730 B2 * | 11/2018 | Aycock .................. H02G 3/088 |
| 2014/0346932 A1 | 11/2014 | Schilling |

* cited by examiner

IN-GROUND ENCLOSURE SYSTEM

CROSS-REFERENCE TO RELATED APPLICATIONS

The present application is a continuation of U.S. Non-Provisional application Ser. No. 15/694,186, filed Sep. 1, 2017, and U.S. Provisional Patent Application Ser. No. 62/483,005, filed Apr. 7, 2017, the entireties of which are incorporated herein by reference for all purposes.

FIELD OF THE DISCLOSURE

The present disclosure relates generally to an enclosure, and more specifically to an underground enclosure for telecommunications equipment.

BACKGROUND OF THE INVENTION

A cell tower (also known as a cell site) is a cellular telephone site where antennae and electronic communications equipment are positioned. The working range of a cell tower can depend on several factors, including, for example, the height of the tower relative to the surrounding terrain, the presence of buildings or vegetation that may reflect or absorb the electromagnetic energy, cell phone traffic in the area, and weather conditions. In terms of size, cell towers can be sprawling structures requiring up to 10,000 square feet of land, or about ¼ acre. As such, cell towers are generally placed proximate to areas of high population density so that the most potential users can utilize the towers. However, each cell site can only handle a finite number of calls or data traffic.

SUMMARY OF THE INVENTION

In some embodiments, an in-ground enclosure for housing electrical components is provided. The in-ground enclosure for housing electrical components can include an outer shell, a first compartment located within the outer shell, a second compartment located within the outer shell, an upper panel comprising a first compartment opening for accessing the first compartment and a second compartment opening for accessing the second compartment, a dividing wall separating the first compartment from the second compartment, a first compartment cover adapted for removably sealing the first compartment opening, and a second compartment cover adapted for removably sealing the second compartment opening.

In some embodiments, a telecommunications base station is provided. The telecommunications base station can include an in-ground enclosure for housing electrical components having an outer shell, a first compartment located within the outer shell, which can include a first compartment opening, a second compartment located within the outer shell, which can include a second compartment opening, a dividing wall separating the first compartment from the second compartment, a first compartment cover adapted for removably sealing the first compartment opening, and a second compartment cover adapted for removably sealing the second compartment opening. The telecommunications base station can also include a cellular base station. The cellular base station can include an antenna coupled to signal processing equipment and a power supply, including a battery, such that when in a storage position, the signal processing equipment is positioned within the first compartment and the power supply, e.g., battery, is positioned within the second compartment.

In some embodiments, an in-ground enclosure for housing electrical components is provided. The in-ground enclosure for housing electrical components can include an outer shell, a first compartment located within the outer shell, an upper panel comprising a first compartment opening for accessing the first compartment, and a first compartment cover adapted for removably sealing the first compartment opening. The sidewalls of the in-ground enclosure can have an inner sidewall and an outer sidewall separated by a sidewall gap. The sidewall gap can be filled with a heat transfer particle. The bulk density of the heat transfer particle in the sidewall gap can be at least 75% of a density of the heat transfer particle.

BRIEF DESCRIPTION OF THE DRAWINGS

The features and advantages of the present invention will be more fully disclosed in, or rendered obvious by the following detailed description of the embodiments, which are to be considered together with the accompanying drawings wherein like numbers refer to like parts and further wherein.

DETAILED DESCRIPTION

Figure 1:
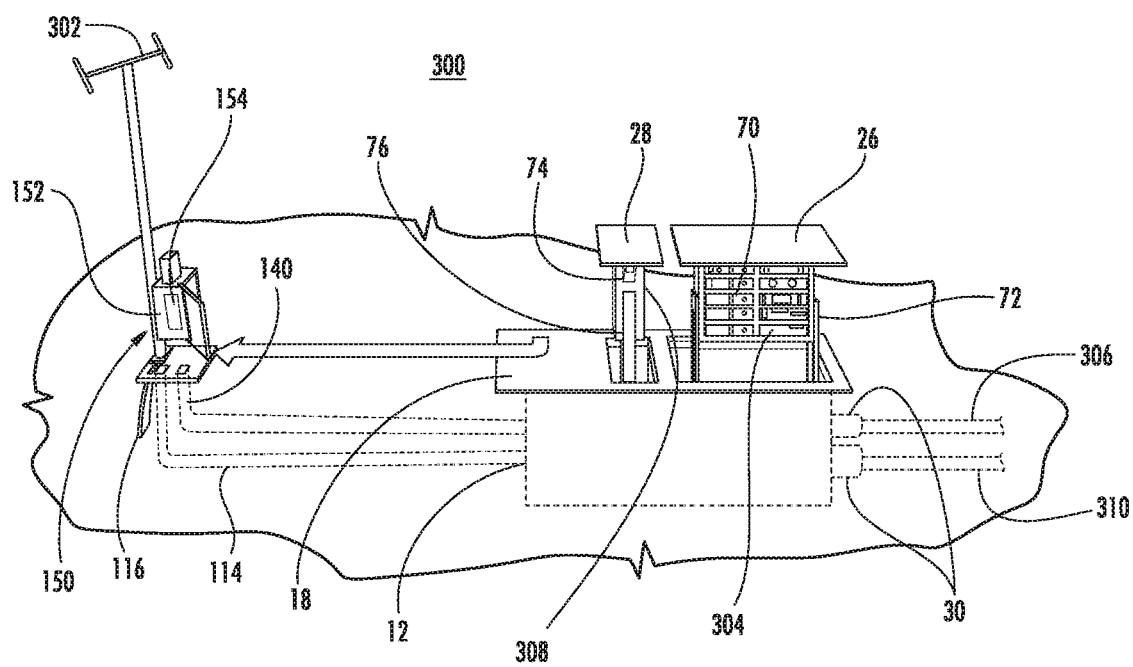
FIG. 1 illustrates an environmental view of an in-ground enclosure that is incorporated as part of a telecommunications base station as described herein.

The description of the preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In this description, relative terms such as "horizontal," "vertical," "up," "down," "top," "bottom," as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both moveable or rigid attachments or relationships, unless expressly described otherwise, and includes terms such as "directly" coupled, secured, etc. The term "operatively coupled" is such an attachment, coupling, or connection that allows the pertinent structures to operate as intended by virtue of that relationship.

As shown in FIGS. 1-22, in various embodiments, an in-ground enclosure 10 for housing electrical components is disclosed. The in-ground enclosure can include an outer shell 12, a first compartment 14 located within the outer shell 12; a second compartment 16 located within the outer shell 12; and an upper panel 18 comprising a first compartment opening 20 for accessing the first compartment 14 and a second compartment opening 22 for accessing the second compartment 16. The in-ground enclosure 10 can include a dividing wall 24 separating the first compartment 14 from the second compartment 16. The in-ground enclosure can also include a first compartment cover 26 adapted for removably sealing the first compartment opening 14, a second compartment cover 28 adapted for removably sealing the second compartment opening 16, or both 26, 28.

In some embodiments, as shown in FIGS. 3-6, one or more external conduits 30 extend from the exterior of the in-ground enclosure 10 to the interior of the first compartment 14 or the second compartment 16. In such embodiments, the external conduits 30 allow a line to pass from outside the in-ground enclosure 10 to the first compartment 14 or the second compartment. Examples of lines that may pass through an external conduit 30 include, but are not limited to, an electrical supply, a communication line (e.g., fiber optics, coaxial cables), an air hose, and wires (e.g., for connecting an external control panel to internal electronics). In some embodiments, the external conduits 30 can be corrosion resistant pipes.

In some embodiments, a first external conduit 30a can be used for a communication line (e.g., a fiber optic cable), a second external conduit 30b can be used for an electrical supply, and a third external conduit 30c can be used for an air hose. The lines passing through the external conduits 30 can be secured with a conduit coupler 32 to form a water-tight and air-tight seal with the external conduit 30. For example, the conduit coupler 32 can be a plug-type sealing system such as that made by Roxsystems and marketed under the ROXTEC® trademark. A conduit coupler 32 can be positioned on the outside end 34 of the external conduit 30, the inside end 36 of the external conduit 30, or both 34, 36.

Figure 4:
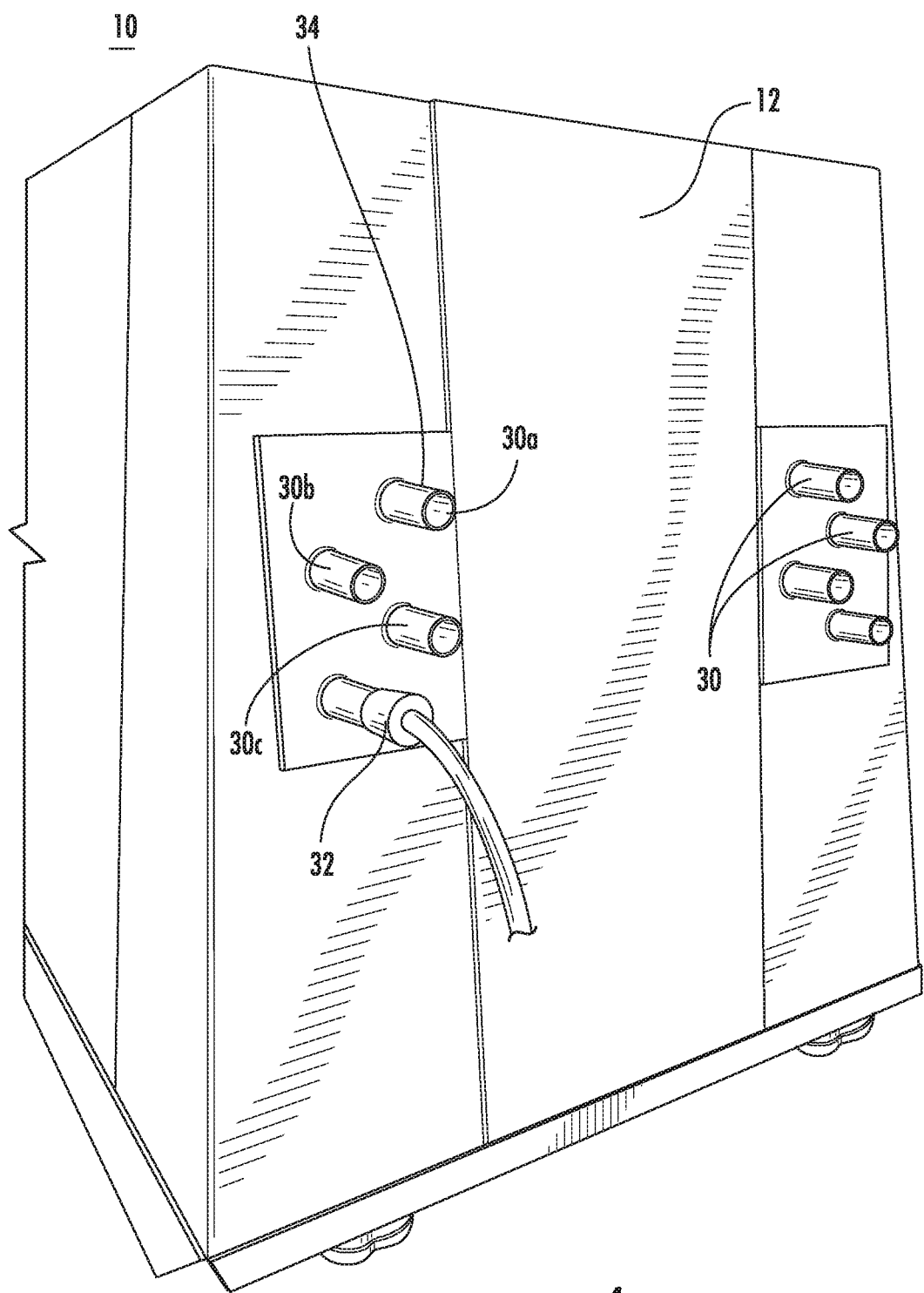
FIG. 4 is a side, perspective view of the in-ground enclosure showing the external conduits as described herein.
Figure 5:
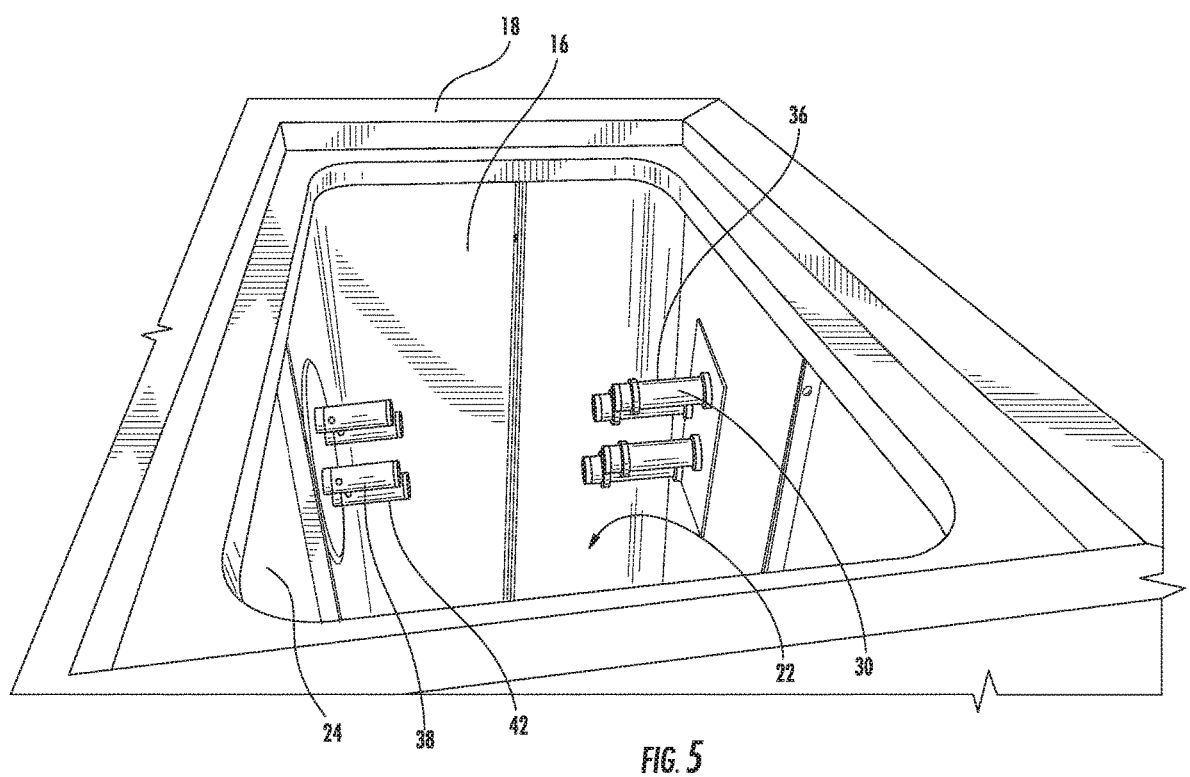
FIG. 5 is a top, perspective view of the second compartment showing the external and internal conduits extending into the second compartment as described herein.
Figure 6:
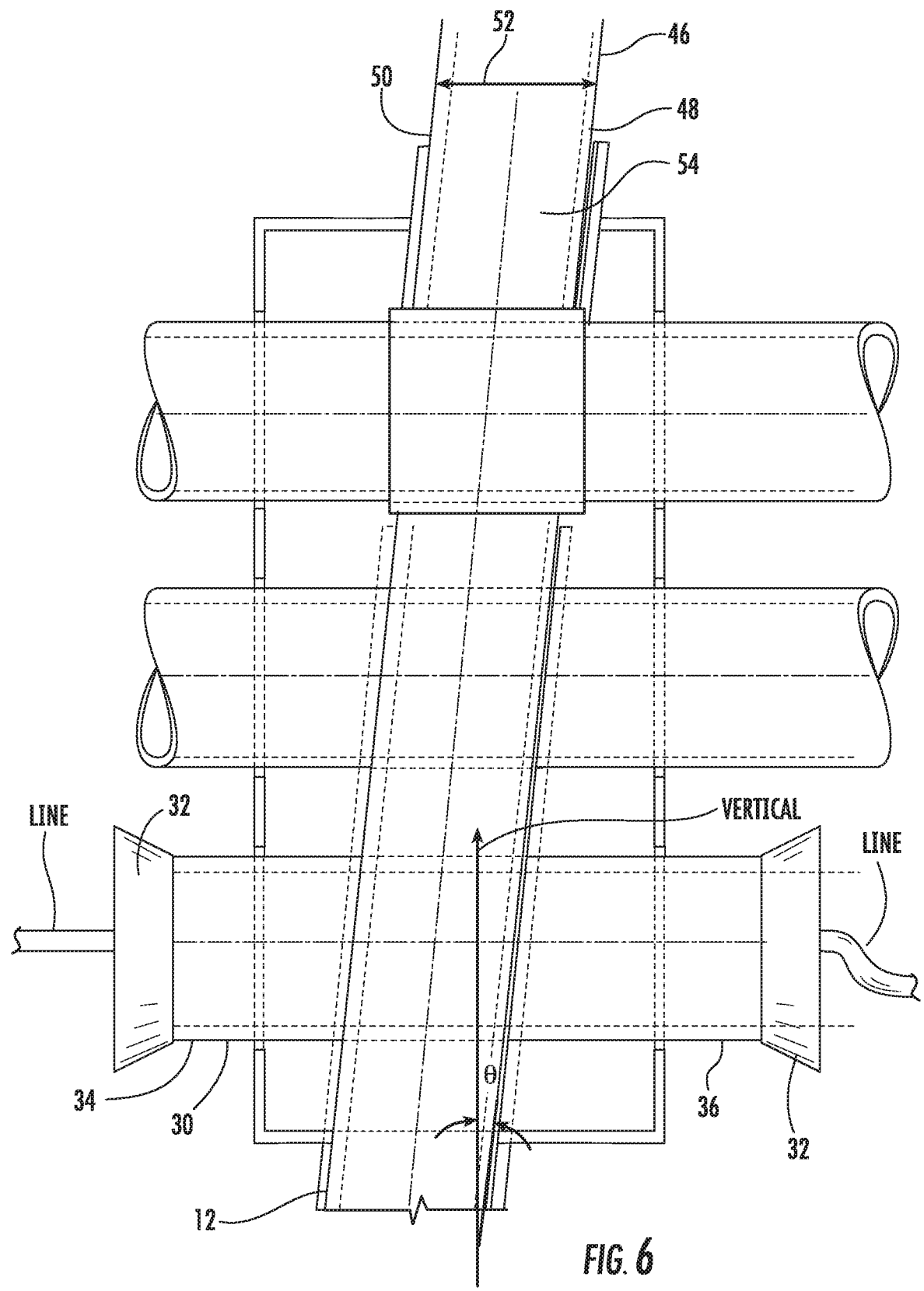
FIG. 6 is a cross-sectional view of a sidewall of the enclosure showing the sidewall gap, as well as, external conduits plugged with conduits and conduit couplers as described herein.
Figure 7:
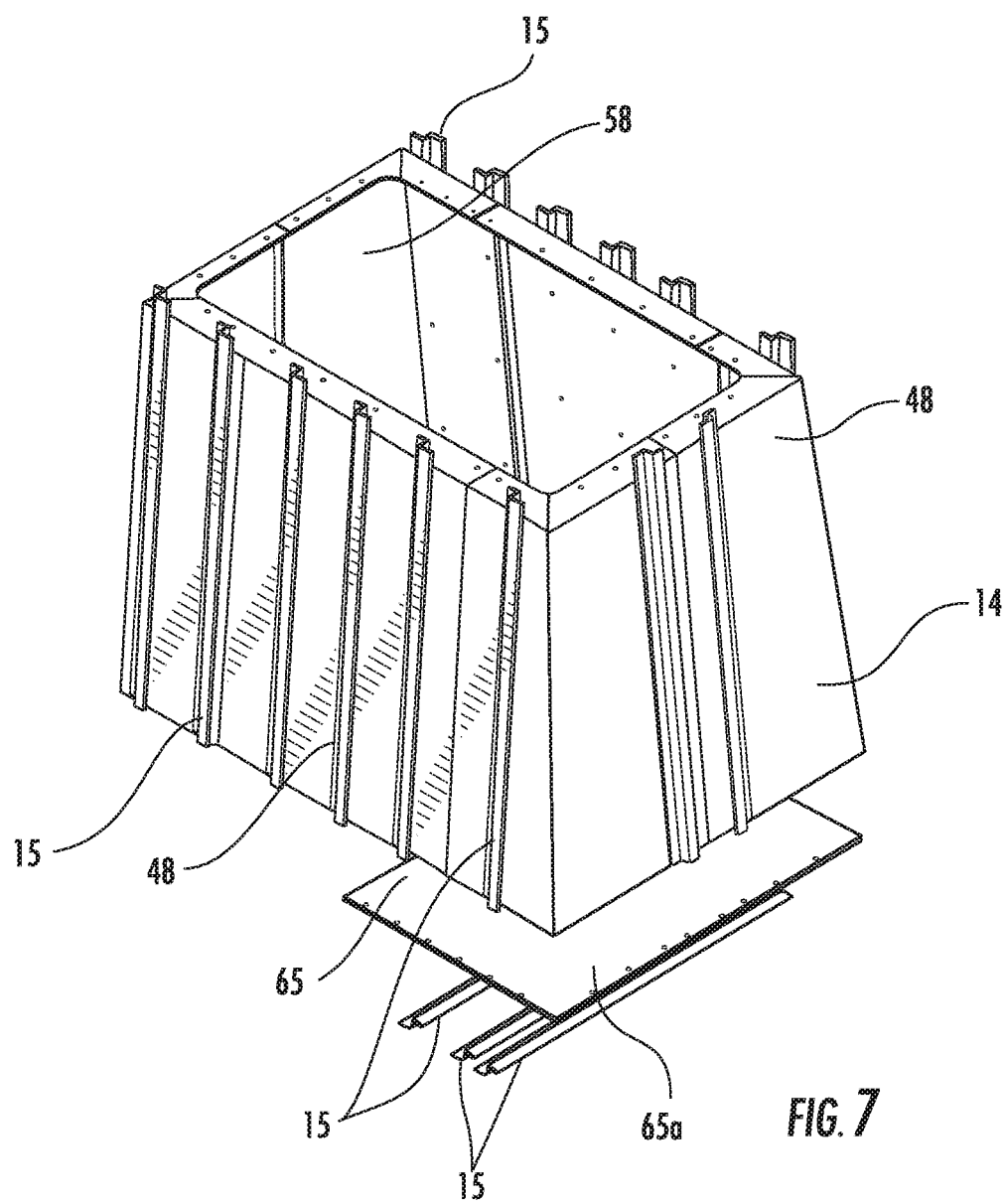
FIG. 7 is a partially exploded view of the first compartment prior to being inserted into the outer shell as described herein.
Figure 8:
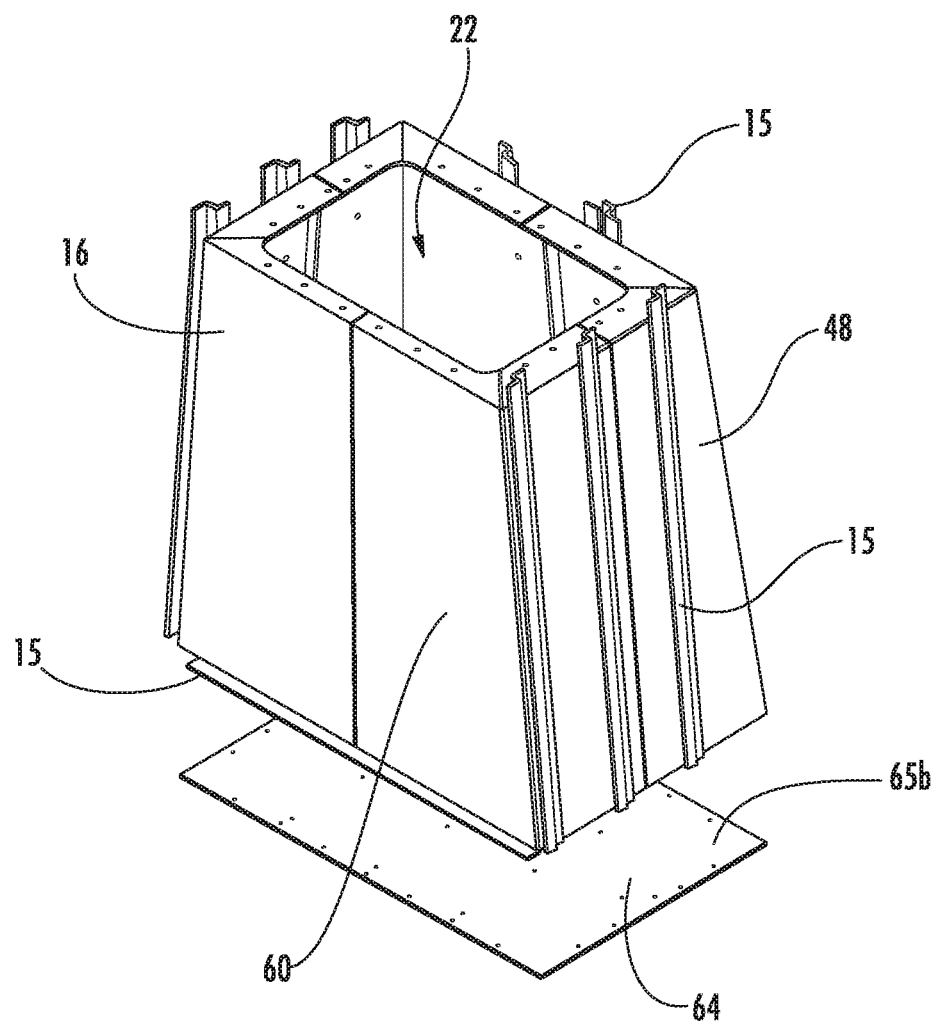
FIG. 8 is a partially exploded view of the second compartment prior to being inserted into the outer shell as described herein.
Figure 9:
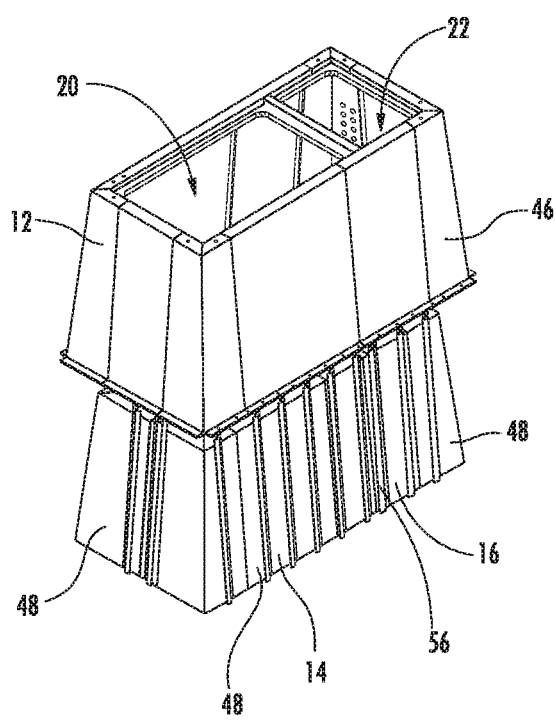
FIG. 9 is a partially exploded view showing the first and second compartments located adjacent one another in preparation for placing the outer shell over them as described herein.
Figure 10:
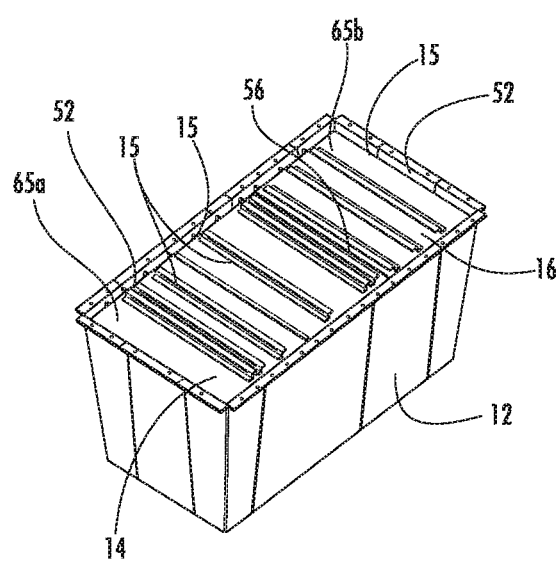
FIG. 10 is a bottom view of FIG. 9 once the first and second compartments have been inserted into the outer shell and spacers have been attached to the bases of the first and second compartments as described herein.
Figure 11:
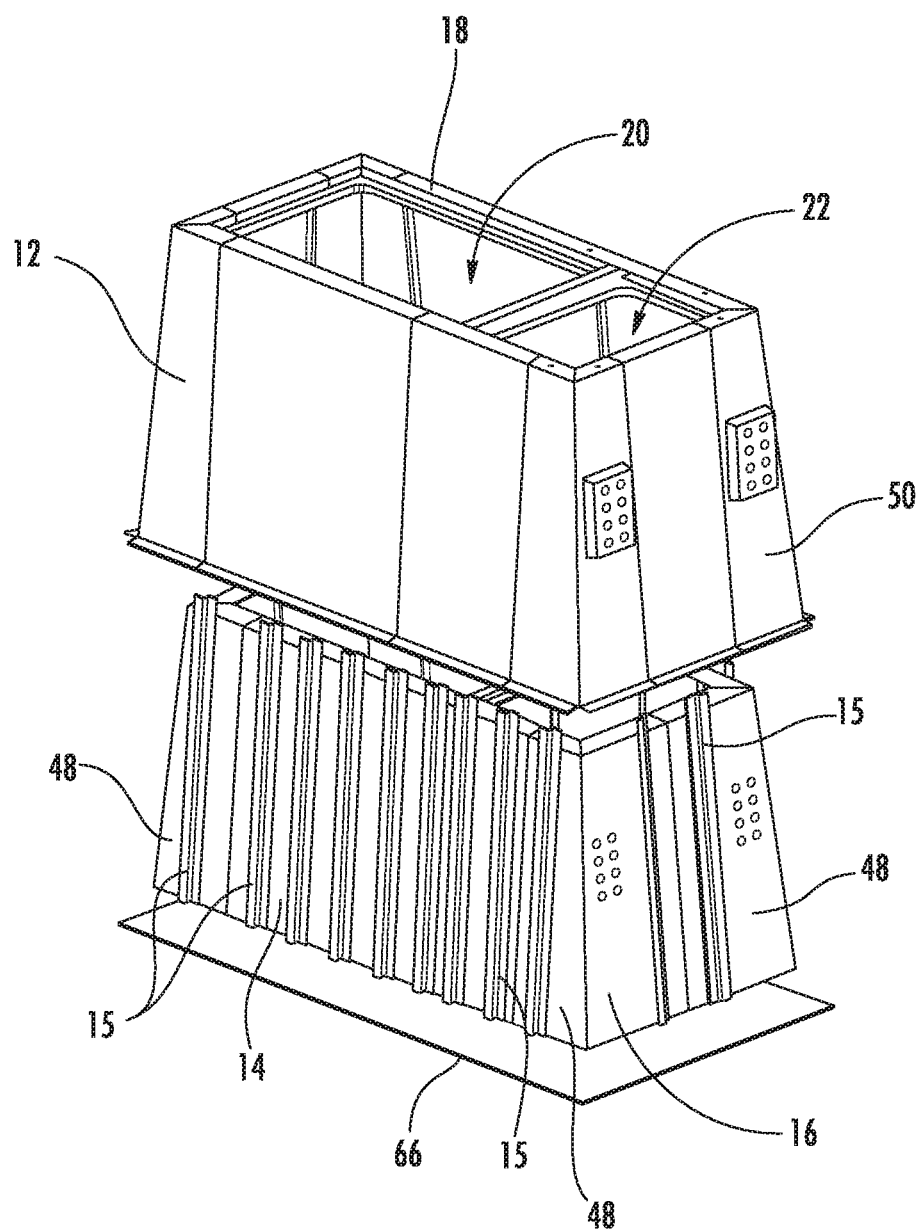
FIG. 11 is a partially exploded view showing the first and second compartments located adjacent one another in preparation for placing the outer shell over them and sealing them in the outer shell with the outer base as described herein.
Figure 12:
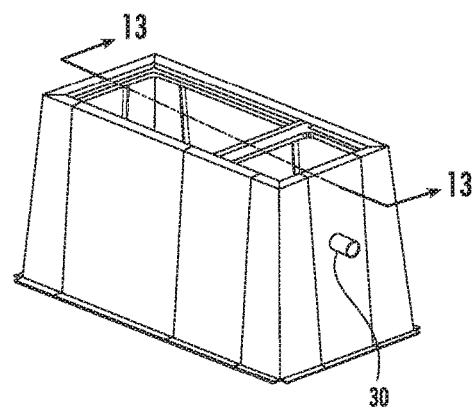
FIG. 12 is a perspective view of an in-ground enclosure.

In some embodiments, one or more internal conduits 38 extend through the dividing wall 24 to allow a line to pass from the first compartment 14 to the second compartment 16. In some embodiments, a first internal conduit 38a can be used for a communication line (e.g., a fiber optic cable), a second internal conduit 38b can be used for an electrical supply, and a third internal conduit 38c can be used for an air hose. The lines passing through the internal conduits 38 can be secured with a conduit coupler 32 to form a water-tight and air-tight seal with the internal conduit 38. For example, as shown in FIGS. 4 and 6, the conduit coupler 32 can be a plug-type sealing system such as that made by Roxsystems and marketed under the ROXTEC® trademark. A conduit coupler 32 can be positioned on the first compartment side 40 of the internal conduit 38, the second compartment side 42 of the internal conduit 38, or both 40, 42.

In some embodiments, the first compartment 14 and the second compartment 16 can be, controllably or permanently, hermetically isolated from one another when the first compartment cover 26 seals the first compartment opening 20 and the second compartment cover 28 seals the second compartment opening 22. As will be discussed in more detail below, when the first and second compartments 14, 16 are controllably hermetically sealed, the exchange of gas can be controlled so that no gas is exchanged when the applicable valves of the gas handling system 78 are closed and gas can be exchanged when the applicable valves of the gas handling system 78 are opened.

Figure 2:
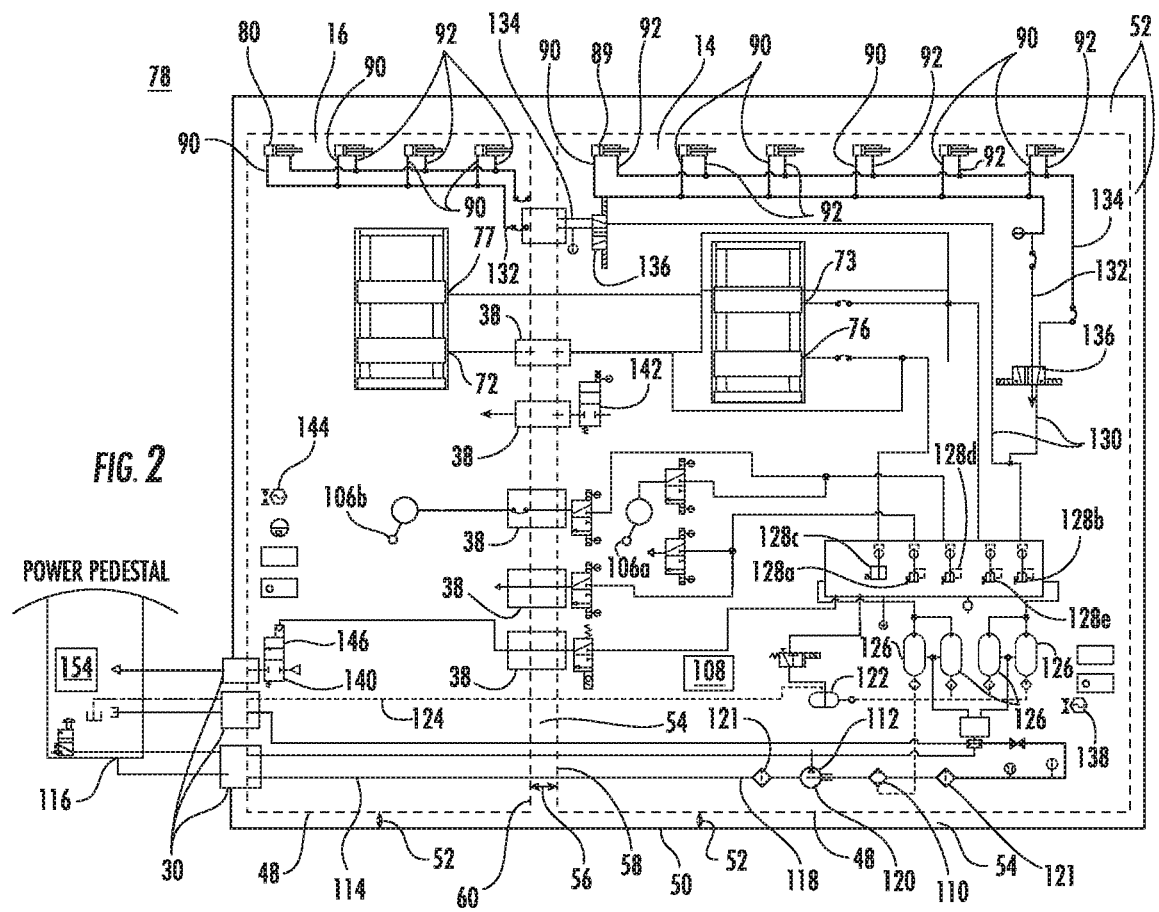
FIG. 2 is a control schematic of an in-ground enclosure, including the gas handling system as described herein.
Figure 3:
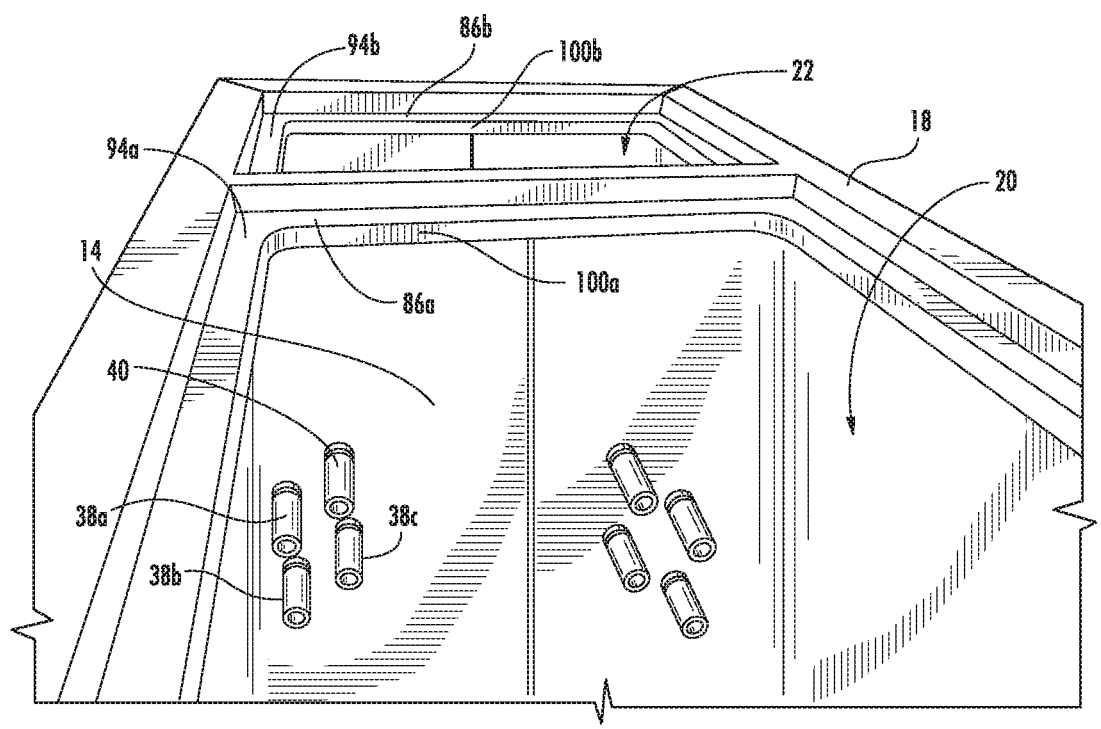
FIG. 3 is a top, perspective view of the first and second compartment openings of the in-ground enclosure as described herein.
Figure 13:
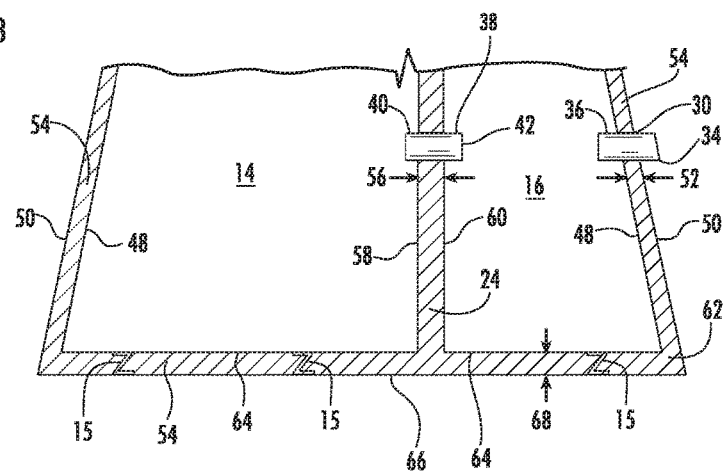
FIG. 13 is a partial, cross-sectional view of FIG. 12 taken along cut line 13-13.

In some embodiments, as shown in FIGS. 2, 6, and 13, the sidewalls 46 of the in-ground enclosure 10 comprise an inner sidewall 48 and an outer sidewall 50 separated by a sidewall gap 52, and the sidewall gap 52 is filled with heat transfer particles 54. In some embodiments, a portion of the inner sidewall 48 comprises exterior sidewalls of the first compartment 14 and exterior sidewalls of the second compartment 16, while the outer sidewall 50 is an exterior sidewall of the outer shell 12.

In some embodiments, as shown in FIGS. 2 and 13, there is a dividing wall gap 56 between the first side 58 and the second side 60 of the dividing wall 24. In some embodiments, the dividing wall gap 56 is filled with heat transfer particles 54. In some embodiments, the first side 58 of the dividing wall 24 comprises an exterior sidewall of the first compartment 14 and the second side 60 of the dividing wall 24 comprises an exterior sidewall of the second compartment 16.

In some embodiments, as best shown in FIG. 13, a base 62 of the in-ground enclosure 10 comprises an inner base 64 and an outer base 66 separated by a base gap 68, wherein the base gap 68 is filled with heat transfer particles 54, wherein a bulk density of the heat transfer particle in the sidewall gap is at least 75% of a density of the heat transfer particle. In some embodiments, a portion of the inner base 64 comprises a base of the first compartment 14 and a base of the second compartment 16, while the outer base 66 is a base of the outer shell 12.

In some embodiments, each of the gaps 52, 56, 68 independently range from 0.5 to 5 inches. In some embodiments, each of the gaps 52, 56, 68 independently range from 0.75 to 4 inches, or from 1 to 3.5 inches. In some embodiments, each of the gaps 52, 56, 68 independently range from 1.25 to 2.5 inches (e.g., 1.5 inches, 1.75 inches, 2.0 inches, 2.25 inches). In some embodiments, the sidewall gap 52 can be 1 to 3 inches, while the dividing wall gap 56 can be 2 to 5 inches, and the base gap 68 can be 0.5 to 3 inches.

In some embodiments, as shown in FIGS. 7-13, the in-ground enclosure 10 can be formed from a first compartment 14 and a second compartment 16 inserted into the outer shell 12. The gaps 52, 56 can be maintained by spacers 15, which may also function as reinforcing elements. In some embodiments, the spacers 15 can be welded to an exterior of the first compartment 14, the second compartment 16, or both 14, 16. In some embodiments, the first compartment 14 and the second compartment 16 can be sealed within the outer shell 12 by the outer base 66, which can be secured to lower edges of the outer shell 12. Like the sides, the gap between the bases 64 of the first compartment 14 and second compartment 16 and the outer base 66 can be maintained by spacers 15. The upper portions of the first compartment 14 and the second compartment 16 should be sealed in an airtight fashion to the upper panel 18 or portions of the outer shell 12 so that a positive pressure can be maintained in each of the first compartment 14 and the second compartment 16. Similarly, in order to keep the heat transfer particles 54 in their optimal state the outer base 66 should be sealed in a waterproof fashion to the outer shell 12.

As shown in FIGS. 7-13, the sides 50 of the outer shell 12 are angled so that the outer shell 12 is wider and longer at the base 66 than proximate the upper panel 18. This design is intended to maintain the in-ground enclosure 10 within the ground and prevent it from "floating," particularly when the surrounding soils are saturated with water. In some embodiments, the sides of the first compartment 14 and the second compartment 16 are also angled so that they remain parallel with the adjacent outer sidewall 50 of the outer shell 12. In some embodiments, the outer sidewalls 50 and, optionally, the inner sidewalls 48 are maintained at an angle ($\theta$) of 2.5 to 30 degrees, or 5 to 20 degrees, or 5 to 15 degrees relative to vertical.

The outer shell 12, first compartment 14, and the second compartment 16 can be formed from corrosion resistant materials. For example, the outer shell 12, first compartment 14, and the second compartment 16 can be formed of a metal alloy that is corrosion resistant and/or can be coated with additional materials to prevent corrosion. In addition, or in the alternative, corrosion of the outer shell 12, first compartment 14, and the second compartment 16 can be reduced or prevented by cathodic protection. In some embodiments, the outer shell 12, first compartment 14, and the second compartment 16 can be formed from a weathering steel, such as that sold by United States Steel Corporation under the trademark COR-TEN®, which can undergo additional protection. For example, the steel can undergo washing, zinc phosphatizing, coating with a primer, coating with a cationic epoxy electrocoat, coating with a polyester paint, curing, etc.

In some embodiments, the bulk density of the heat transfer particles 54 in one or more of the sidewall gap 52, the dividing wall gap 56, and the base gap 68 is at least 75% of a density of the heat transfer particles 54. In some embodiments, the bulk density of the heat transfer particles 54 in one or more of the sidewall gap 52, the dividing wall gap 56, and the base gap 68 is at least 77.5%, or at least 80%, or at least 82.5%, or at least 85%, or at least 87.5%, or at least 90% of the density of the heat transfer particles 54. In some embodiments, the heat transfer particles 54 can be made of a material having a thermal conductivity of at least 70 W/mK (~40 BTU-ft/hr/ft$^{2\circ}$ F.), or at least 100 W/mK (~58 BTU-ft/hr/ft$^{2\circ}$ F.), or at least 200 W/mK (~115.6 BTU-ft/hr/ft$^{2\circ}$ F.), or at least 300 W/mK (~173.3 BTU-ft/hr/ft$^{2\circ}$ F.), or at least 400 w/mK (~231.1 BTU-ft/hr/ft$^{2\circ}$ F.), or at least 450 W/mK (~260 BTU-ft/hr/ft$^{2\circ}$ F.), or at least 500 W/mK. (~288.9 BTU-ft/hr/ft$^{2\circ}$ F.). In some embodiments, the heat transfer particles 54 can be made of a material having an electrical resistivity of at least 300 $\mu\Omega$-in, or at least 400 $\mu\Omega$-in, or at least 425 $\mu\Omega$-in. In some embodiments, the heat transfer particles 54 can be made of a material having a density in the range of 1.25 g/cm$^3$ to 2.00 g/cm$^3$ or from 1.30 g/cm$^3$ to 1.88 g/cm$^3$.

In some embodiments, the heat transfer particles have maximum dimensions of 50 to 1,000 microns, or from 75 to 750 microns, or from 100 to 500 microns, or from 125 to 400 microns. In some embodiments, the minimum size of the maximum dimension is at least 10 microns. In some embodiments, the median (D50) particle size is between 75 microns and 180 microns. In some embodiments, a maximum of 30 wt. % of the particles, or 25 wt. % of the particles, or 20 wt. % of the particles, do not pass through an 80 mesh (180 micron) screen. In some embodiments, a maximum of 50 wt. % of the particles, or 45 wt. % of the particles, or 40 wt. % of the particles, do not pass through a 100 mesh (150 micron) screen. In some embodiments, a maximum of 30 wt. % of the particles, or 25 wt. % of the particles, or 20 wt. % of the particles, do pass through a 325 mesh (44 micron) screen. This prevents dusting problems and provides a light-weight, high performance heat transfer material.

In some embodiments, the heat transfer particles 54 are flakes. In some embodiments, the heat transfer particle comprises graphite particles (e.g., flakes). In some embodiments, the heat transfer particles comprise expanded graphite particles (e.g., flakes). Examples of expanded graphite particles include those sold by Entergris, Inc. under the trademark POCO® graphites, and those sold by Carbon Graphite Materials, Inc. In some embodiments, the heat transfer particles comprise natural or synthetic graphite flakes. In some embodiments, the heat transfer particles comprise crystalline graphite flakes. In some embodiments, the heat transfer particles comprise graphite flakes having at least 90% carbon, or at least 94% carbon, or at least 96% carbon, or at least 99% carbon. In some embodiments, the heat transfer particles comprise less than 5% moisture, or less than 2% moisture, or less than 1% moisture, or less than 0.5% moisture.

In some embodiments, the desired bulk density levels of the heat transfer particles 54 can be obtained by filling the sidewall gap 52 and, optionally, the dividing wall gap 56 and base gap 68 with heat transfer particles 54 while the outer shell 12 is on a shaker. The shaking action facilitates tight packing of the heat transfer particles 54. In some embodiments, the outer shell 12 can be filled from the base-side and, once the desired packing level has been reached, the base 13 on the outer shell can be secured to the lower portion of the outer shell 12.

In some embodiments, the desired density levels the desired bulk density levels of the heat transfer particles 54 can be obtained by filling the sidewall gap 52 and, optionally, the dividing wall gap 56 and base gap 68 with a slurry containing heat transfer particles 54 suspended in a solvent, which is subsequently heated off. In some embodiments, the heat transfer particles 54 can partially or completely fill the sidewall gap 52 and, optionally, the dividing wall gap 56 and base gap 68, then be sprayed with a volatile liquid to facilitate tight packing. In some instances, this can be an iterative process where a portion of the gap 52, 56, and/or 68 is filled with heat transfer particles 54, which are then sprayed with the volatile liquid and this process is repeated until the applicable gap 52, 56 and/or 68 is filled with heat transfer particles 54. This process generally results in a well-packed bed of heat transfer particles 54 that is in intimate contact with the opposing surfaces defining the applicable gaps 52, 56, 68. Examples of solvents that can be used in this process include, but are not limited to, ethylene glycol, propylene glycol, water, and/or a mixture thereof. In some embodiments, such as crystalline graphite, the particles do not absorb water and the solvent can be water.

In some embodiments, for example, the slurry can be prepared in a mixer (e.g., cement mixer), whereby the heat transfer particles 54 are mixed with a solvent. The heat transfer particles 54 and solvent can be selected based on the desired viscosity or other properties of the slurry. For example, a plurality of graphite particles can be mixed with water in a cement mixer for 5-60 minutes before being filling gaps 52, 56, and/or 68. After filling the gaps 52, 56, and/or 68, the outer shell can be subjected to packing step to facilitate tight packing of the heat transfer particles. Any suitable means of packing can be used, such as shaking, pounding, vibrating, sonicating, etc. Once the desired packing has been achieved, the solvent can be allowed to evaporate or otherwise removed (e.g., heated in an oven), leaving behind the packed heat transfer particles. Additional particles and/or powder coatings may be added after solvent removal.

In some embodiments, as shown in FIGS. 1, 2, 14, and 15, the in-ground enclosure 10 includes an equipment rack 70, including an equipment lift system 72 coupled to a base 65a in the first compartment 14. The equipment lift system 72 is adapted to move the equipment rack 70 between a retracted position where the equipment rack 70 is completely contained within the first compartment 14 and an extended position where the equipment rack 70 extends through the first compartment opening 20 and is accessible to a user standing outside the in-ground enclosure 10. For example, the equipment rack 70 and be arranged so that a user standing along one side of the in-ground enclosure 10 can access the equipment rack 70.

Figure 22:
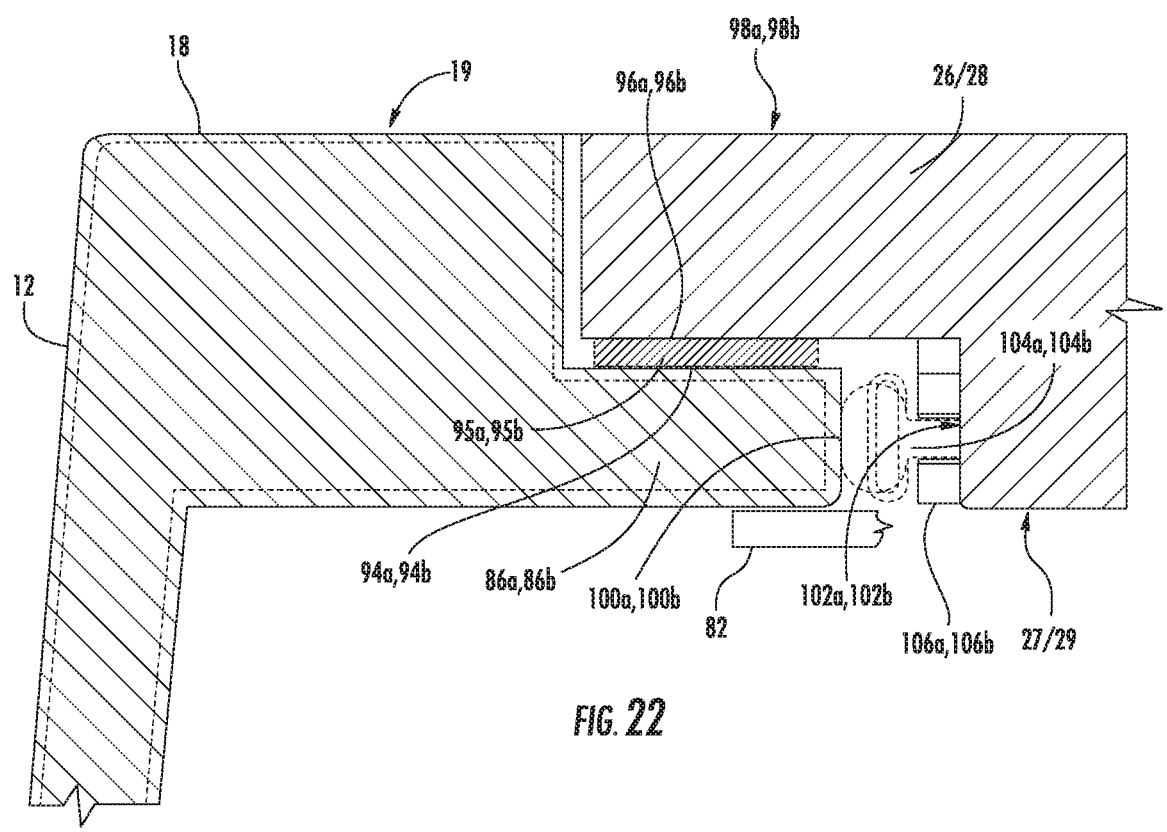
FIG. 22 is a cross-sectional view of the interface between a compartment opening and a compartment cover in the locked position (without a cover lock for clarity) as described herein.

In some embodiments, as best shown in FIGS. 1 and 22, the first compartment cover 26 is coupled to a top of the equipment rack 70 and the equipment lift system 72 is adapted to move between a retracted position where the first compartment cover 26 seals the first compartment opening 20 and an extended position where a majority of or the entirety of the equipment rack 70 extends through the first compartment opening 20 above the top surface 19 of the upper panel 18.

In some embodiments, the in-ground enclosure 10 includes a battery rack 74, including a battery lift system 76 coupled to a base 65b in the second compartment 16. The battery lift system 76 is adapted to move the battery rack 74 between a retracted position where the battery rack 74 is completely contained within the second compartment 16 and an extended position where the battery rack 74 extends through the second compartment opening 22 and is accessible to a user standing outside the in-ground enclosure 10. For example, the battery 74 and be arranged so that a user standing at one end of the in-ground enclosure 10 can access the battery rack 74.

In some embodiments, as best shown in FIGS. 1, 14, 15, and 22, the second compartment cover 28 is coupled to a top of the battery rack 74 and the battery lift system 76 is adapted to move between a retracted position where the second compartment cover 28 seals the second compartment opening 22 and an extended position where a majority of or the entirety of the battery rack 74 extends through the second compartment opening 22 above the top surface 19 of the upper panel 18.

In some embodiments, the equipment lift system 72, the battery lift system 76, or both 72, 76, can independently be operated pneumatically, hydraulically, electrically, or a combination thereof. In some embodiments, the equipment lift system 72, the battery lift system 76, or both 72, 76 are controlled by a gas handling system 78 within the in-ground enclosure 10.

In some embodiments, as shown in FIGS. 2 and 17-21, the first compartment cover 26 includes a plurality of cover locks 80. For example, in some embodiments, the first compartment cover 26 includes at least four cover locks 80 or at least six cover locks 80. In some embodiments, the second compartment cover 28 includes a plurality of cover locks 80. For example, in some embodiments, the second compartment cover 28 includes at least four cover locks 80.

In some embodiments, each cover lock 80 includes a locking arm 82 and a sealing hub 84. In some embodiments the locking arm 82 is adapted for rotating between a locked position where a portion of the locking arm 82 extends underneath an edge 86a, 86b of the first or second compartment opening 20, 22 to prevent the compartment cover 26, 28 from being removed from the applicable compartment opening 20, 22, and an open position that allows the compartment cover 26, 28 to be removed from the applicable compartment opening 20, 22.

In some embodiments, such as that shown in FIGS. 17-21, the sealing hub 84 is coupled to the locking arm 82, and the sealing hub 84 is adapted for adjusting a distance between the locking arm 82 and a bottom surface 27, 29 of the applicable compartment cover 26, 28. Thus, once the compartment cover 26, 28 is covering the applicable compartment opening 20, 22, the locking arm 82 can rotate into the locked position and the sealing hub 84 can reduce the distance between the locking arm 82 and the bottom surface 27, 29 of the applicable compartment cover 26, 28. Eventually the locking arm 82 will contact the edge 86a, 86b of the applicable compartment opening 20, 22, which will lock the applicable compartment cover 26, 28 in place.

In some embodiments, as shown in FIGS. 17-21, each sealing hub 84 is disposed, in part, within a respective cover lock recess 88 in a bottom surface 27, 29 of the applicable compartment cover 26, 28. In some embodiments, the in-ground enclosure 10 includes a gas handling system 78 adapted for controllably supplying pressurized air to rotate each sealing hub 84 in a first direction to reduce the distance between the bottom surface 27, 29 of the applicable compartment cover 26, 28 and the locking arm 82, and supplying pressurized air to rotate the sealing hub 84 in a second direction, opposite the first direction, to increase the distance between the bottom surface 27, 29 of the applicable compartment cover 26, 28 and the locking arm 82. For example, the gas handling system 78 can have a first line coupled to a first lock recess inlet 90 and a second line coupled to a second lock recess inlet 92, where the sealing hub 84 rotates the first direction when pressurized gas is supplied to the first lock recess inlet 90 (but not the second lock recess inlet 92) and the sealing hub 84 rotates the second direction when pressurize gas is supplied to the second lock recess inlet 92 (but not the first lock recess inlet 90).

In some embodiments, the pressurized gas is supplied to the first lock recess inlet 90 of each cover lock 80 to rotate the locking arm 82 and the sealing hub 84 to the locked position. In the event of a malfunction, each cover lock 80 can be accessed from outside the in-ground enclosure by removing the respective access panel 81, which allows the operator to manually turn the sealing hub 84 to move the cover lock 80 to the unlocked position. In some embodiments, the pressurized gas will remain in or be continuously supplied to the sealing hub 84 to maintain the cover lock 80 in the locked position and resist manual rotation of the sealing hub 84. In such instances, it may be possible to manually release the pressurized gas from the locking hub 84 using the control panel 154, which will then allow the operator to manually turn the sealing hub 84 to move the cover lock 80 to the unlocked position. In some embodiments, the sealing hub 84 can require a special coupling (e.g., a double D socket wrench) in order to turn the locking hub 84 when accessed via the access panel 81.

Figure 21:
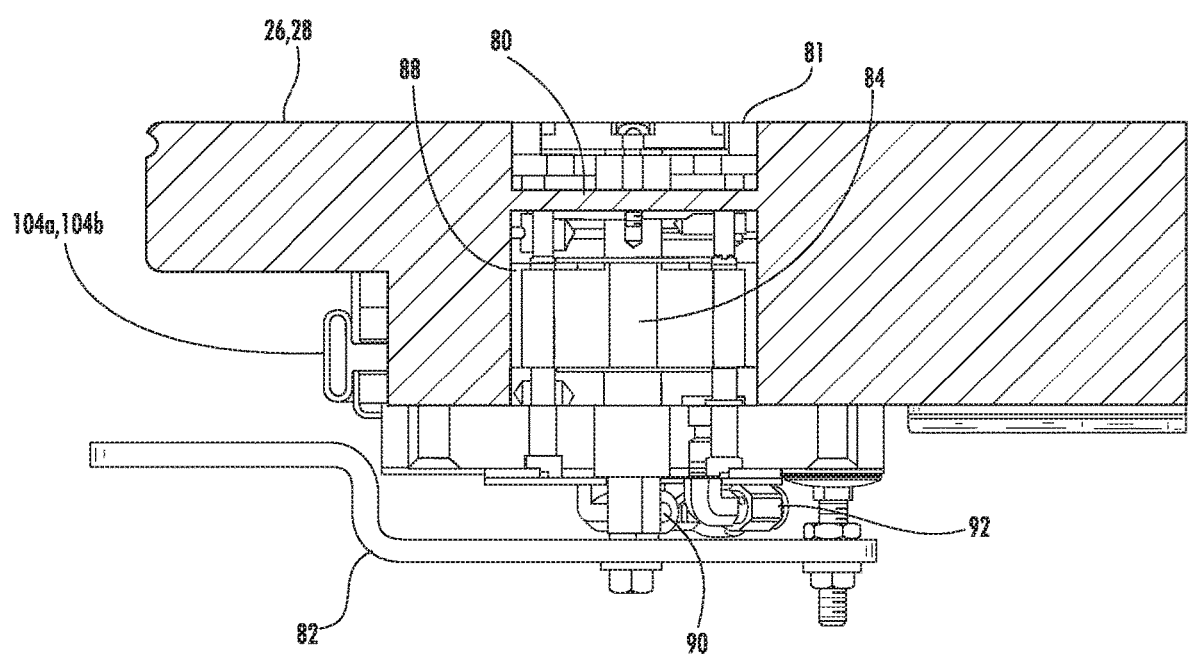
FIG. 21 is a semi-transparent view of a cover lock disposed in the cover lock recess as described herein.

In some embodiments, as shown in FIGS. 21 and 22, the edge 86a of the first compartment opening 20 includes a first compartment inset shelf 94a and, when the first compartment cover 26 is in the locked position, the outer lip 96a of the first compartment cover 26 rests on the first compartment inset shelf 94a and an upper surface 98a of the first compartment cover 26 is approximately level with an upper surface 19 of the upper panel 18. In some embodiments, a sealing material 95a can be coupled to the first compartment inset shelf 94a, the outer lip 96a, or both 94a, 96a so that, when the first compartment cover 26 is in the locked position, the outer lip 96a rests on the sealing material 95a. In some embodiments, the first compartment inset shelf 94a includes a vertical thickness with an edge defining a first abutment 100a. In some embodiments, the first compartment cover 26 comprises a first vertical surface 102a extending from the first compartment outer lip 96a to the bottom surface 27 thereof. In some embodiments, a first inflatable seal 104a extends outwardly from the first vertical surface 102a, and the first inflatable seal 104a exerts force against the first abutment 100a when the first compartment cover 26 is in the locked position and the first inflatable seal 104a is inflated by the gas handling system 78. As will be understood, the first inflatable seal 104a can be deflated by opening a first inflatable seal valve 106a of the first inflatable seal 104a. The first inflatable seal valve 106a can be electronically operated (e.g., a solenoid valve).

In some embodiments, the edge 86b of the second compartment opening 22 includes a second compartment inset shelf 94b and, when the second compartment cover 28 is in the locked position, the outer lip 96b of the second compartment cover 28 rests on the second compartment inset shelf 94b and an upper surface 98b of the second compartment cover 28 is approximately level with an upper surface 19 of the upper panel 18. In some embodiments, a sealing material 95b can be coupled to the first compartment inset shelf 94b, the outer lip 96b, or both 94b, 96b so that, when the second compartment cover 28 is in the locked position, the outer lip 96b rests on the sealing material 95b. In some embodiments, the second compartment inset shelf 94b includes a vertical thickness with an edge defining a second abutment 100b. In some embodiments, the second compartment cover 28 comprises a second vertical surface 102b extending from the second compartment outer lip 96b to the bottom surface 29 thereof. In some embodiments, a second inflatable seal 104b extends outwardly from the second vertical surface 102b, and the second inflatable seal 104b exerts force against the second abutment 100b when the first compartment cover 28 is in the locked position and the second inflatable seal 104b is inflated by the gas handling system 78. As will be understood, the second inflatable seal 104b can be deflated by opening a second inflatable seal valve 106b of the second inflatable seal 104b. The second inflatable seal valve 106b can be electronically operated (e.g., a solenoid valve).

In some embodiments, the first compartment cover 26, the second compartment cover 28, or both 26, 28, include at least one reinforcing sheet embedded in a continuous phase. In some embodiments, the first compartment cover 26, the second compartment cover 28, or both 26, 28, include rebar embedded in a continuous phase. In some embodiments, the first compartment cover 26, the second compartment cover 28, or both 26, 28, include rebar and at least one reinforcing sheet embedded in a continuous phase. In some embodiments, the continuous phase can be an impermeable concrete, polymer, or ceramic capable of forming an impermeable structure. For example, the continuous phase can be a polymeric concrete material. In some embodiments, the first compartment cover 26, second compartment cover 28, or both can be capable of supporting a car, truck, or van parked on the first or second compartment cover 26, 28 resting on the applicable compartment opening 20, 22. For example, in some embodiments, the first compartment cover 26, second compartment cover 28, or both can be capable of supporting at least 20,000 pounds, at least 30,000 pounds, or at least 40,000 pounds when the first or second compartment cover 26, 28 is locked over the applicable compartment opening 20, 22.

In some embodiments, the first compartment cover 26, the second compartment cover 28, or both 26, 28, include at least two reinforcing sheets embedded in a continuous phase. In some embodiments, major fibers in two of the reinforcing sheets are at an angle of 10 to 80 degrees, or 15 to 75 degrees, or 20 to 70 degrees, or 30 to 60 degrees relative to one another. Examples of reinforcing sheets that can be used herein include brass and galvanized steel tapes/fabrics such as those sold by Hardwire, LLC under the trademark HARDWIRE®. In some embodiments, the one or more of the reinforcing sheets can provide electromagnetic (EM) radiation blocking. In some embodiments, the one or more of the reinforcing sheets embedded in the compartment cover 26, 28 can prevent a drill bit from penetrating the applicable compartment cover 26, 28.

In some embodiments, a Faraday shield (also known as a cage) can be embedded into compartment covers 26, 28 to block certain electromagnetic fields from penetrating the covers. In some embodiments, the Faraday shield can block electromagnetic (EMI) or radio frequency interference (RFI), such as radio waves from a nearby radio transmitter, from interfering with the equipment inside the in-ground enclosure. In some embodiments, the Faraday shield can block electric currents, such as lightning strikes and electrostatic discharges, from interfering with and/or damaging the equipment inside the in-ground enclosure. By shielding EMI/RFI, the Faraday shield can prevent eavesdropping or monitoring of telephone calls connected through the in-ground enclosure. The Faraday shield can comprise any suitable material. In some embodiments, the Faraday shield can comprise a metal or metallic material. In some embodiments, the Faraday shield can comprise a metal hardwire grid or mesh, or a plurality of grids and/or meshes. When two or more grids or meshes are used, a first can be placed in a north-south direction and a second can be placed on top of the first and oriented in the same or a different direction. In some embodiments, the second grid or mesh can be secured at an angle, with respect to the first, in order to provide a difference in harmonics for the Faraday shield. In some embodiments, the second grid or mesh can be placed at an angle between 10-80 degrees, 25-70°, 20-60°, 25-50°, 25-45°, 25-35°, or 30-35°. In some embodiments, the grid or mesh can comprise stranded flex ground wires cad-welded per bonding and grounding specifications known and utilized in the telecommunications industry. In some embodiments, the Faraday shield can comprise a flexible metallic fabric, a fine metal mesh, or any other suitable material.

In some embodiments, as shown schematically in FIG. 2, the in-ground enclosure 10 includes a gas handling system 78, comprising a dehumidifier 110, an air compressor 112 located within the outer shell 12 (e.g., within the first compartment 14 or the second compartment 16). In some embodiments, an ambient air intake line 114 having an air intake line inlet 116 in fluid communication with ambient air outside the outer shell 12 and an air intake line outlet 118 in fluid communication with a compressor inlet 120. In some embodiments, a filter 121 may be located between the air intake line outlet 118 and the compressor inlet 120, but this still reads on fluid communication between the air intake line outlet 118 and the compressor inlet 120. In some embodiments, a filter 121 can be located prior to the compressor 112 and another filter 123 can be located following the dehumidifier 110. The gas handling system 78 can be adapted to provide air at an elevated pressure to an interior of the first compartment 14, an interior of the second compartment 16, or both 14, 16. As used herein, "elevated pressure" refers to a pressure of at least 1 pound per square inch gauge. As used herein, "dehumidified air" is used to refer to a gas (e.g., air) that has passed through the dehumidifier 110.

In some embodiments, the gas handling system 78 includes a water trap 122 adapted to collect water removed by the dehumidifier or otherwise condensed by the gas handling system 78. In some embodiments, the gas handling system 78 includes a water purge line 124 for purging the water from the in-ground enclosure 10.

In some embodiments, the gas handling system 78 is adapted to provide dehumidified air at an elevated pressure to the interiors of both the first compartment 14 and the second compartment 16. Thus, when the compartment covers 26, 28 are in the locked position the first compartment 14, the second compartment 16, or both 14, 16 can be maintained with a pressure greater than atmospheric pressure. This is another precaution to prevent both water vapor and water from seeping into the applicable compartment 14, 16, whether through the compartment openings 20, 22 or some other location of potential intrusion. In some embodiments, when the compartment covers 26, 28 are in the locked position, the first compartment 14, the second compartment 16, or both 14, 16 are maintained at a positive pressure of at least 1 psig, or at least 2 psig, or at least 3 psig.

The gas handling system 78 can include a processor 108 for processing information from the numerous sensors 138, 144, 146, switches 136, valves 140, 142, and electronic devices 112, controlling the gas handling system 78, and communicating with connected devices, such as the control panel 154 of the power pedestal 150 or remotely located devices (e.g., a mobile device using a secured app or a desktop or laptop computer). Although the processor 108 is not shown connected to any particular electromechanical devices, it will be understood that that processor 108 can be in communication with any or all electromechanical devices necessary to operate the in-ground enclosure 10 or telecommunications base station 300 via any techniques known in the art (examples include, but are not limited to, hard wire, wifi, blue tooth, RF, etc.).

In some embodiments, the air compressor 112 pressurizes intake air before passing the intake air through the dehumidifier 110 and providing the pressurized, dehumidified air to pressurized storage tanks 126. In some embodiments, the storage tanks 126 are in fluid communication with a plurality of regulators 128 for providing dehumidified air at a variety of pressures.

For example, in some embodiments, the at least one storage tank 126 can store dehumidified air at a pressure of at least 100 psig, the at least one of the storage tanks 126 can be coupled to at least three of the following:

- a first regulator 128a that provides air at a first pressure to pressurize interiors of the first compartment 14, the second compartment 16, or both 14, 16;
- a second regulator 128b that provides air at a second pressure to the sealing hubs 84 of the cover locks 80 disposed in the first compartment cover 26, the second compartment cover 28, or both 26, 28; and
- a third regulator 128c that provides air at a third pressure to the equipment lift system 72, the battery lift system 76, or both 72, 76,
- a fourth regulator 128d that provides air at a fourth pressure to the first inflatable seal 104a, the second inflatable seal 104b, or both 104a, 104b,
- a fifth regulator 128e that provides air at a fifth pressure to the equipment cooling diffuser(s) 73, the battery cooling diffuser(s) 77, or both.

In some embodiments, the first pressure, the second pressure and the third pressure are different. In some embodiments, the first pressure and the second pressure are different. In some embodiments, the first and third pressures are different. In some embodiments, the second and third pressures can be the same and can be supplied by the same regulator. In some embodiments, the fourth and fifth pressures can be the same and can be supplied by the same regulator. In some embodiments, the first pressure, the second pressure, the third pressure, the fourth pressure, and the fifth pressure are different.

In some embodiments, there is a master lock air line 130 that is split into a locking air line 132 and an unlocking air line 134. The flow of pressurized air between the locking air line 132 and the unlocking air line 134 is controlled by a lock control switch 136. The locking air line 132 can be coupled to the first lock recess inlet 90 of each cover lock 80, while the unlocking air line 134 can be coupled to the second lock recess inlet 92 of each cover lock 80.

In some embodiments, the first pressure can range from 1 to 9 psig, or from 1.5 psig to 7 psig, or from 2 to 5 psig. In some embodiments, the second pressure can range from 40 to 150 psig, or from 60 to 135 psig, or from 70 to 120 psig. In some embodiments, the third pressure can range from 50 to 300 psig, or from 75 to 250 psig or from 100 to 200 psig. In some embodiments, the fourth pressure can range from 10 to 80 psig, or from 12.5 to 70 psig, or from 15 to 60 psig, or from 17.5 to 50 psig. In some embodiments, the fifth pressure can range from 2 to 25 psig, or from 3 to 22.5 psig, or from 5 to 20 psig. In some embodiments, the dehumidified gas can be stored in the pressurized storage tanks 126 can be stored at a pressure of at least 125 psig. In some embodiments, the first pressure can be 3 psig, the second pressure 100 psig, the third pressure can be 125 psig, the fourth pressure can be 25 psig, and the fifth pressure can be 10 psig. As will be understood, in any case, each of the second pressure through fifth pressure will be greater than the first pressure, which is the effective ambient pressure when the first and second compartments are locked.

Figure 14A:
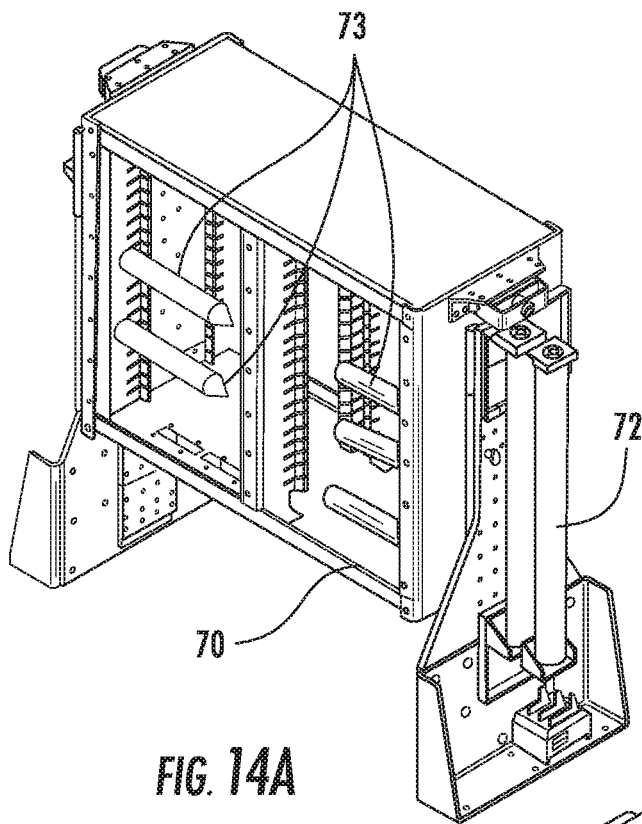
FIG. 14A and FIG. 14B are perspective views of an equipment rack and equipment lift system as described herein, as well as, the battery rack and battery lift system as described herein.
Figure 14B:
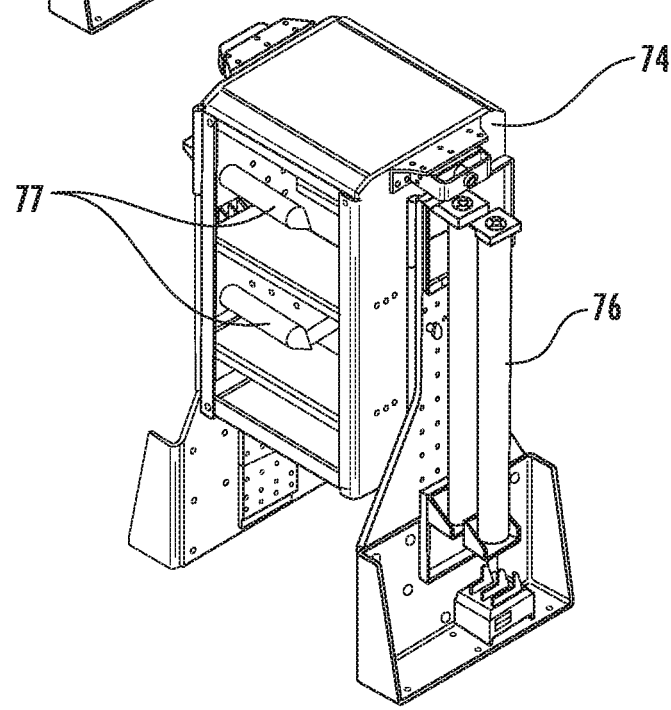
Figure 16:
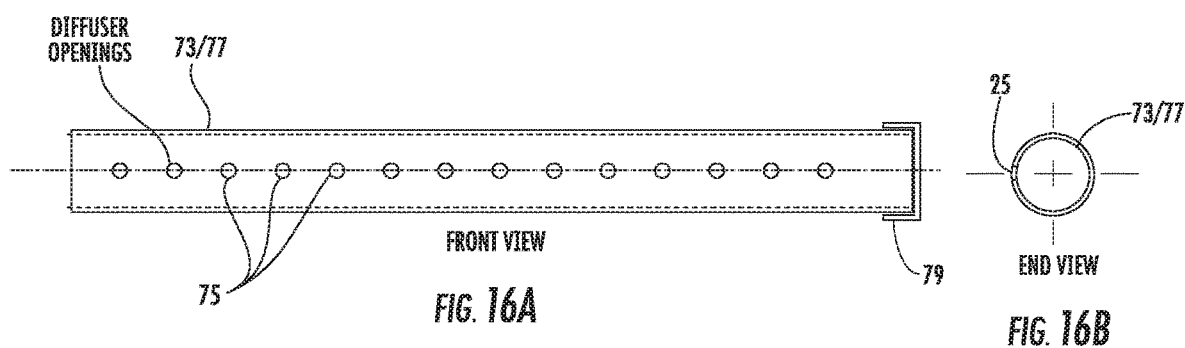
FIG. 16A and FIG. 16B are front and end views of a diffuser that can be used in connection with the equipment racks and battery racks as described herein.
Figure 17:
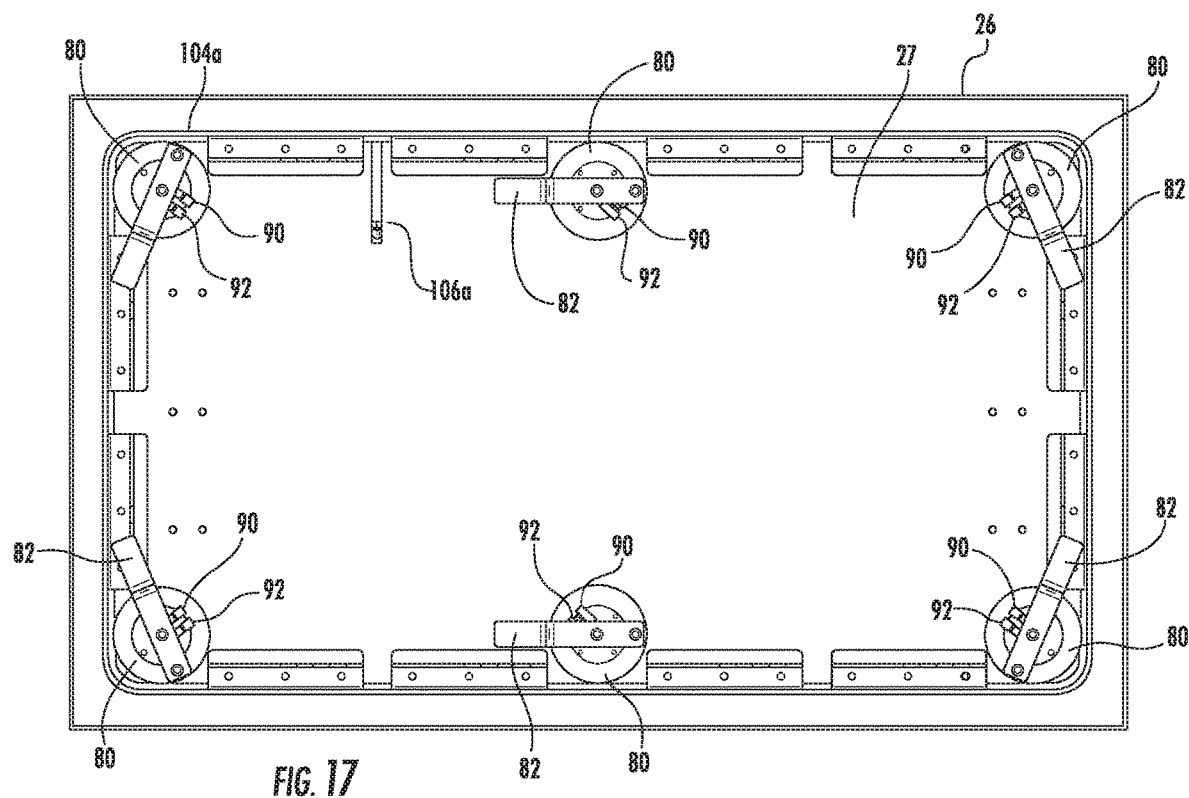
FIG. 17 is a bottom view of a first compartment cover showing the locking arms in the open position as described herein.
Figure 18:
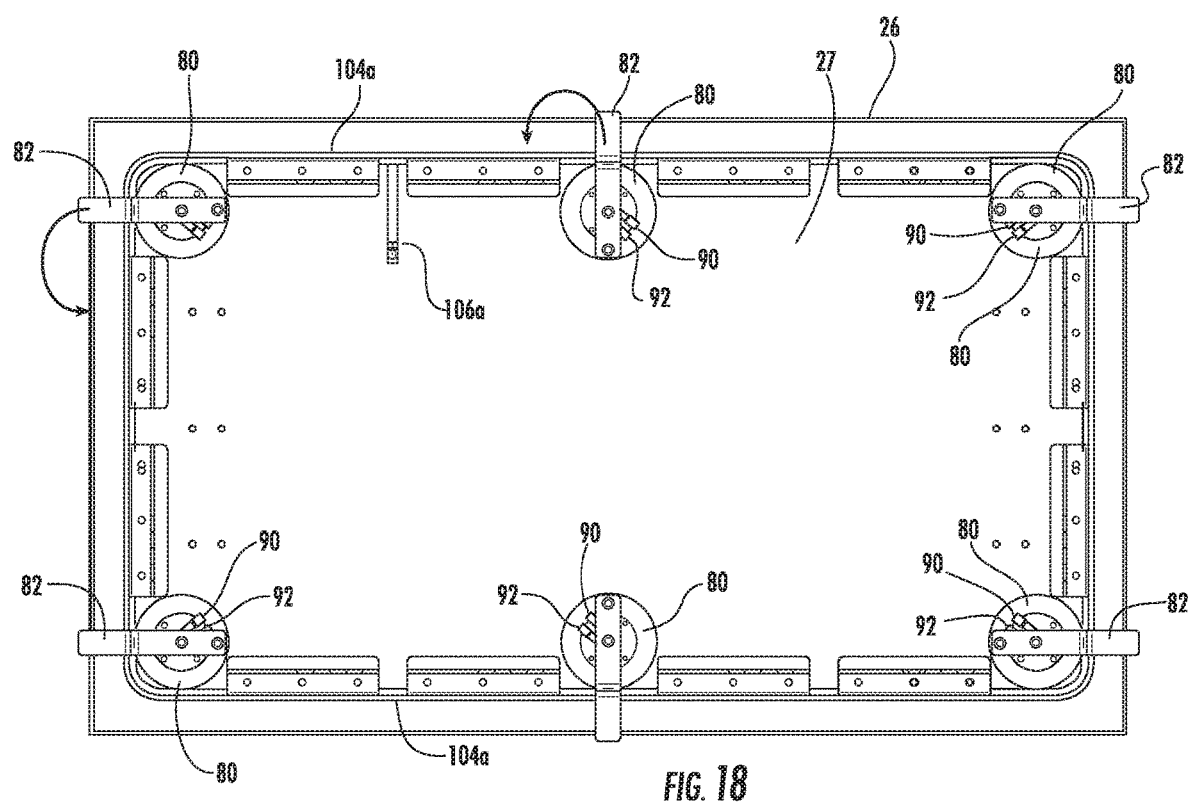
FIG. 18 is a bottom view of a first compartment cover showing the locking arms in the locked position as described herein.
Figure 19:
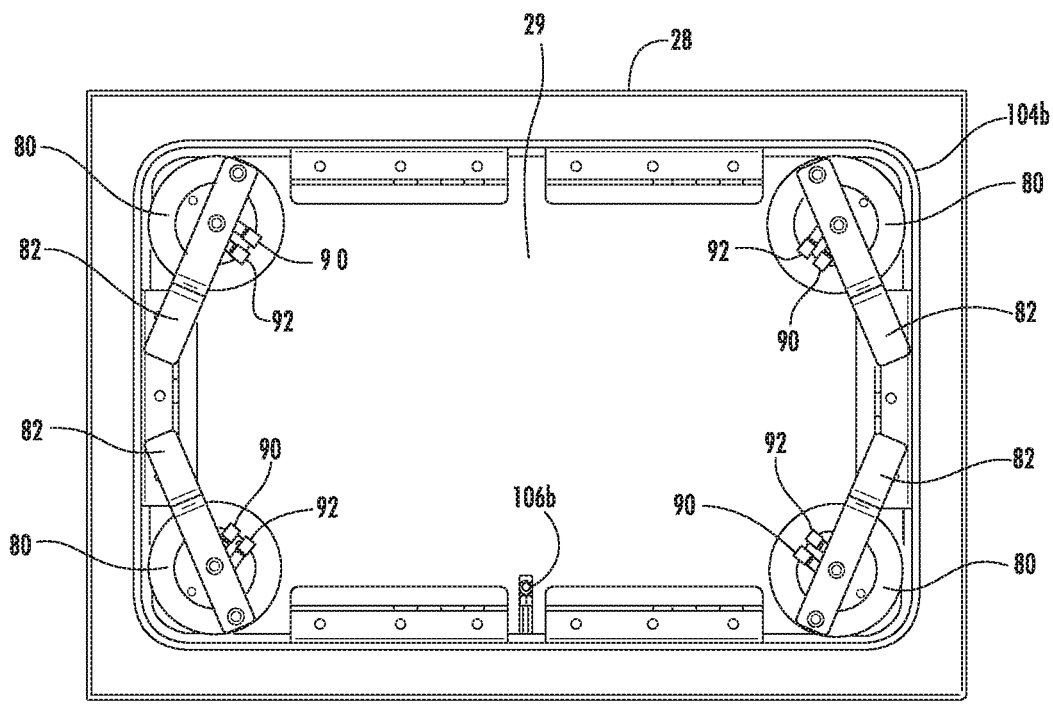
FIG. 19 is a bottom view of a second compartment cover showing the locking arms in the open position as described herein.
Figure 20:
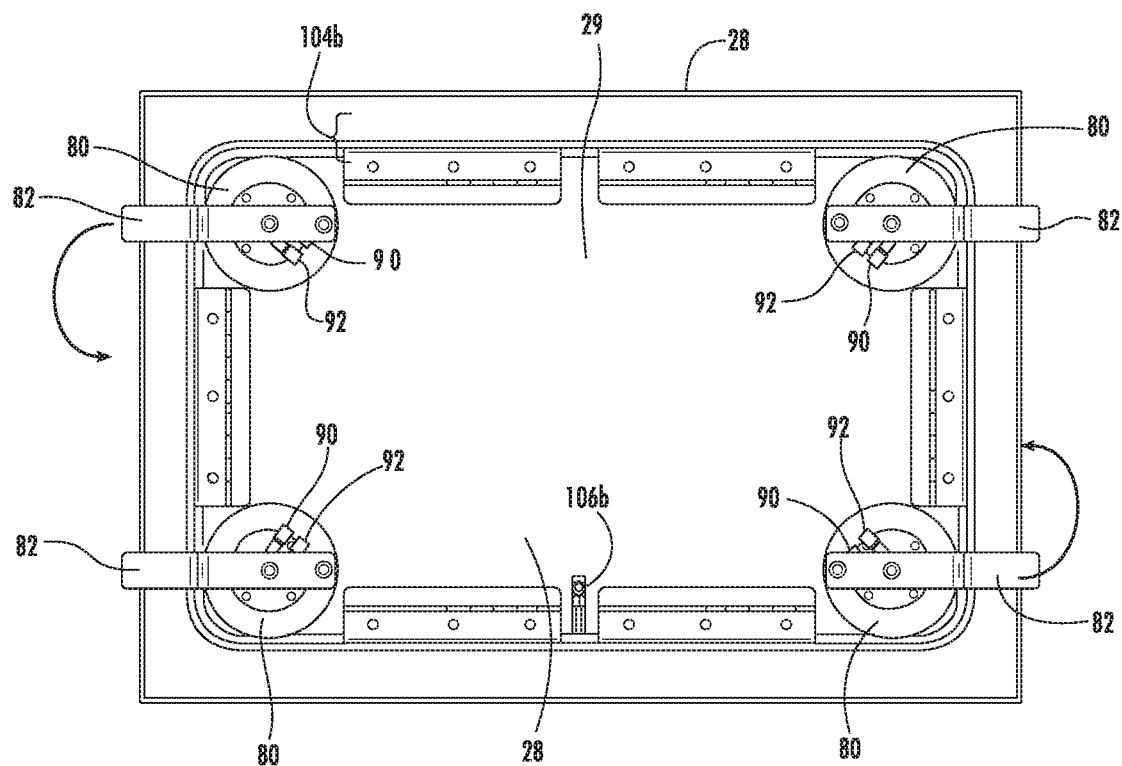
FIG. 20 is a bottom view of a second compartment cover showing the locking arms in the locked position as described herein.

In some embodiments, as shown in FIGS. 2, 14, and 16, the gas handling system 78 is adapted to provide air at a fourth pressure to at least one equipment cooling diffuser 73, at least one battery cooling diffuser 77, or both 73, 77 adapted for blowing air over equipment stored in the equipment rack 70 and at least one battery stored in the battery rack 74, respectively. The cooling diffusers 73, 77 blow air over the equipment and/or batteries and toward the inner sidewalls 48, which are in contact with the heat transfer particles. Thus, the cooling diffusers 73, 77 facilitate heat dissipation and help maintain the first and second compartments 14, 16 at desirable operating temperatures for the equipment and batteries. In some embodiments, the cooling diffusers 73, 77 can have the form of a pipe with a plurality of cooling orifices 75 therein for distributing the pressurized air exiting the cooling orifices 75 and an end cap 79.

In some embodiments, the gas handling system 78 also includes a first humidity sensor 138 in the first compartment 14. The gas handling system 78 can be adapted so that, when the first humidity sensor 138 detects that a humidity in the first compartment exceeds a predetermined level, air in the first compartment 14 is vented to an outside atmosphere and replaced with dehumidified air at an elevated pressure. In some embodiments, opening a purge vent 140 in the second compartment 16 and venting air from the first compartment 14 to the second compartment 16 through a compartment transfer vent 142. As this process will lower the pressure in both the first compartment 14 and the second compartment 16, once the purge vent 140 is closed, the gas handling system 78 can provide pressurized, dehumidifier air to both the first compartment 14 and the second compartment 16. The compartment transfer vent 142 can be closed either before or after the first compartment 14 and second compartment 16 are re-pressurized (e.g., at the first pressure).

In some embodiments, the gas handling system 78 includes a second humidity sensor 144 in the second compartment 16. The gas handling system 78 can be adapted so that, when the second humidity sensor 144 detects that a humidity in the second compartment 16 exceeds a predetermined level, air in the second compartment 16 is vented to an outside atmosphere and replaced with dehumidified air at an elevated pressure. For example, the air in the second compartment can be vented through the purge vent 140, which can then be closed before the second compartment 16 is re-pressurize (e.g., at the first pressure).

In some embodiments, in order to dissipate hydrogen, the purge vent 140 can be opened at a regular interval regardless of the readings of the humidity sensors 138, 144 of the hydrogen sensor 146. In some embodiments, the regular interval for opening the purge vent 140 can be 1 to 60 seconds every 15 to 120 minutes in order to maintain safe conditions. In some embodiments, the purge vent 140 can be opened for 2 to 45 seconds or 3 to 30 seconds, or 4 to 20 seconds, or 5 to 15 seconds. In some embodiments, the purge vent 140 can be opened every 20 to 90 minutes, or every 25 to 60 minutes, or every 30 to 45 minutes.

In some embodiments, the gas handling system 78 includes a hydrogen sensor 146 in the second compartment 16. The gas handling system 78 can be adapted so that, when the hydrogen sensor 146 detects that a hydrogen concentration in the second compartment 16 exceeds a predetermined level, air in the second compartment 16 is vented to an outside atmosphere and replaced with dehumidified air at an elevated pressure. For example, the air in the second compartment can be vented through the purge vent 140, which can then be closed before the second compartment 16 is re-pressurize (e.g., at the first pressure). In some embodiments, the in-ground enclosure 10 can be operated so that, absent an elevated hydrogen reading, the purge vent 140 is opened for 10 seconds every 30 minutes to vent the hydrogen.

In some embodiments, the in-ground enclosure 10 also includes a power pedestal 150. The power pedestal 150 can include a lockbox 152, which provides an operator access to an external control panel 154 for operating the in-ground enclosure 10 and monitoring the status of the in-ground enclosure 10. For example, an operator can use the external control panel to unlock the compartment cover(s) 26, 28, and actuate the equipment lift system 72, the battery lift system 76, or both 72, 76 in order to access the equipment rack 70, the battery rack 74, or both 70, 74. Each of the lift systems 72, 76 can include a lock-out system 156 to maintain the respective lift system 72, 76 in the extended position so that an operator can access the interior of the first compartment 14 and/or the second compartment 16 without the risk on being crushed by the lift system 72, 76 returning to the retracted position.

Figure 15:
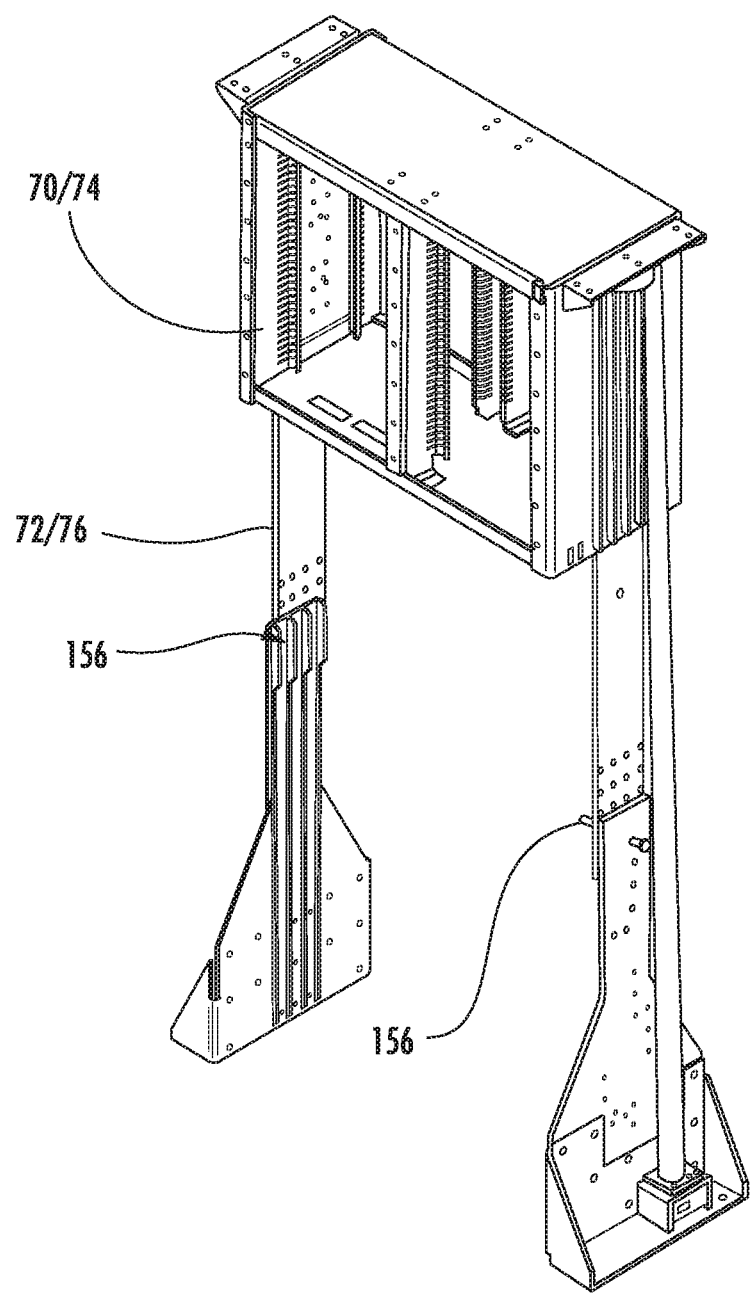
FIG. 15 is a perspective view of a rack and lift system showing a lock-out system as described herein.

An example of such a lock system 156 is shown in FIG. 15, where a hole at the top of the base plate aligns with a hole at the bottom of the intermediate plate, so that a pin 156 can pass through the holes and maintain the lift system 72, 76 in an extended position even if there is a loss of air pressure. In some embodiments, each side of the lift system 72, 76 can include a lock-out system 156. This arrangement allows an operator to confidently enter the first compartment 14 or the second compartment 16 feeling confident that the racks 70, 74 will not retract to the closed position and injure the operator.

In some embodiments, as shown in FIGS. 1 and 2, the control panel 154 can provide an interface where the user can monitor the performance of the in-ground enclosure 10 and the equipment contained therein. For example, in some embodiments, the control panel 154 can display the current and/or historical temperature, humidity, pressure, and hydrogen levels within the first and second compartments 14, 16. In some embodiments, the control panel 154 can also display the current status of each of the components attached to the gas handling system 76 (e.g., the cover locks 80, the inflatable seals 104a, 104b, the diffusers 73, 77, and the pressurized storage tanks 126). In some embodiments, the control panel 154 can also display current and historical performance date for the equipment housed in the in-ground enclosure (e.g., data demand, calls dropped, communication errors, communication outages).

In some embodiments, as shown in FIGS. 1 and 2, the air intake line inlet 116 can be part of the power pedestal 150. In some embodiments, the purge vent 140 can exhaust to the power pedestal 150. Of course, the air intake line inlet 116 and the purge vent exhaust can be located in other, protected positions.

In another embodiment, as shown in FIG. 1, a telecommunications base station 300 is described. The telecommunications base station 300 can include an in-ground enclosure 10 as described herein, an antenna 302 coupled to signal processing equipment 304 and a power supply 306, comprising a battery 308, wherein, in a retracted position, the signal processing equipment 304 is positioned within the first compartment 14 and the battery 308 is positioned within the second compartment 16.

The signal processing equipment 304 can be connected to a telecommunications cable 310 for connecting into a terrestrial telecommunications network. The antenna 302 can be adapted for sending data to and receiving data from a wireless device, including, but not limited to, a smart phone, a tablet computer, a car, or a laptop computer.

In operation, the in-ground enclosure 10 described herein allows cellular providers to locate telecommunications base stations 300 in locations that were previously unavailable due to space constraints. The in-ground enclosures 10 described herein can be installed in conventional easements, such as those adjacent to roads and railroad tracks. In addition, the in-ground enclosures 10 can be installed in a parking lot and be used as a parking spot when the in-ground enclosure is in the locked position. With this development, telecommunications antennae can be located in densely populated areas or in areas where above-ground installations are not practicable for one reason or another. This greatly enhances the ability of cellular providers to enhance coverage in an unobtrusive manner wherever additional bandwidth is necessary.

In some embodiments, the in-ground enclosure 10 can be used in a variety of other applications. For example, in some embodiments, the in-ground enclosure 10 can enclose a plurality of batteries in the first and/or second compartments 14, 16, where the batteries are adapted to be charged by a solar array and supply energy to a structure having an energy requirement (e.g., a house, an office building, a retail building, a warehouse, a drilling site, etc.). In other embodiments, the in-ground enclosure 10 can enclose a fuel cell in the first compartment 14 and fuel (hydrogen tanks) in the second compartment 16. The fuel cell can be adapted to supply energy to a structure having an energy requirement (e.g., a house, an office building, a retail building, a warehouse, a drilling site, etc.). As will be understood, the in-ground enclosure 10, including the lift systems 72, 76, cover locks 80, and gas handling system 78, can operate as described herein in order to protect the equipment located in the in-round enclosure 10. In some embodiments, such as those described for the solar array and fuel cell, the in-ground enclosure 10 can include a single compartment.

Experimental Results

In initial experiments, an in-ground enclosure without the heat transfer particles or cooling diffusers that contained 12 radios, 4 rectifiers, and 2 power supplies reached an internal temperature of 205° F. When the same electronics were operated within an in-ground enclosure with the heat transfer particles (E103 High Purity Natural Crystalline Flake Graphite sold by Carbon Graphite Materials, Inc.) and cooling diffusers the internal temperature dropped to 88° F. The sidewall gap and dividing wall gap were both 1.75". The heat transfer particles had less than 10% of the flakes with a size less than 24.29 microns, a median flake size (D50) of 140.18 microns, and less than 10% of the flakes with a size greater than 328.53. The electronics has a shut-down temperature of 159° F. Thus, the in-ground enclosures described herein should maintain an internal temperature well within the operating temperature of the applicable electronics.

Although the subject matter has been described in terms of exemplary embodiments, it is not limited thereto. It should be noted that the figures are not necessarily drawn to scale and any particular dimensions in the Figures are not intended to be limiting. Rather, the appended claims should be construed broadly, to include other variants and embodiments, which may be made by those skilled in the art.

What is claimed is:

1. An enclosure for housing electrical components, comprising:
   an outer shell;
   a first compartment located within the outer shell;
   a second compartment located within the outer shell;
   an upper panel comprising a first compartment opening for accessing the first compartment and a second compartment opening for accessing the second compartment;
   a dividing wall separating the first compartment from the second compartment;
   a first compartment cover adapted for removably sealing the first compartment opening; and
   a second compartment cover adapted for removably sealing the second compartment opening;
   an equipment rack comprising an equipment lift system that is coupled to a base in the first compartment;
   wherein the first compartment cover is coupled to a top of the equipment rack, and
   wherein the equipment lift system is adapted to move between a retracted position, where the first compartment cover seals the first compartment opening and an extended position where the equipment rack extends through the first compartment opening above the top surface,
   wherein said enclosure is adapted for in-ground installation.

2. The enclosure of claim 1, wherein the first compartment and the second compartment can be hermetically isolated from one another when the first compartment cover seals the first compartment opening and the second cover seals the second compartment opening.

3. The enclosure system of claim 1, wherein the first compartment cover, the second compartment cover, or both, comprise at least one reinforcing sheet embedded therein.

4. The enclosure system of claim 3, wherein the at least one reinforcing sheet prevents at least a portion of electromagnetic radiation from passing therethrough.

5. The enclosure of claim 1, further comprising:
   a gas handling system, comprising a dehumidifier, an air compressor located within the outer shell, and an ambient air intake line having an air intake line inlet in fluid communication with ambient air outside the outer shell and an air intake line outlet in fluid communication with a compressor inlet of the air compressor, wherein said gas handling system is adapted to provide air at an elevated pressure to an interior of the first compartment, an interior of the second compartment, or both.

6. The enclosure of claim 5, wherein the gas handling system is adapted to provide dehumidified air to the interiors of both the first compartment and the second compartment.

7. The enclosure of claim 5, where the gas handling system is adapted to provide:
air at a first pressure to pressurize interiors of both the first compartment and the second compartment;
air at a second pressure to pneumatic air locks disposed in the first compartment cover, the second compartment cover, or both; and
air at a third pressure to pneumatic lifts for an equipment rack in the first compartment, a battery lift in the second compartment, or both,
wherein the first pressure, the second pressure, and the third pressure are different from each other.

8. The enclosure of claim 7, where the gas handling system is adapted to provide:
air at a fourth pressure to at least one diffuser adapted for blowing air over equipment stored in the equipment rack, a battery stored in the battery rack, or both,
wherein the first pressure, the second pressure, the third pressure, and the fourth pressure are different from each other.

9. The enclosure of claim 5, wherein the gas handling system further comprises a first humidity sensor in the first compartment, and
wherein, when the first humidity sensor detects that a humidity in the first compartment exceeds a predetermined level, air in the first compartment is vented to an outside atmosphere and replaced with dehumidified air at an elevated pressure.

10. The enclosure of claim 5, wherein the gas handling system further comprises a second humidity sensor in the second compartment, and
wherein, when the second humidity sensor detects that a humidity in the second compartment exceeds a predetermined level, air in the second compartment is vented to an outside atmosphere and replaced with dehumidified air at an elevated pressure.

11. The enclosure of claim 5, wherein the gas handling system further comprises a hydrogen sensor in the second compartment, and
wherein, when a hydrogen level in the second compartment exceeds a predetermined level, air in the second compartment is vented to an outside atmosphere and replaced with dehumidified air at an elevated pressure.

12. A telecommunications base station, comprising:
an enclosure for housing electrical components, comprising:
an outer shell,
a first compartment located within the outer shell, comprising a first compartment opening,
a second compartment located within the outer shell, comprising a second compartment opening,
a dividing wall separating the first compartment from the second compartment,
a first compartment cover adapted for removably sealing the first compartment opening, and
a second compartment cover adapted for removably sealing the second compartment opening;
a cellular base station, comprising an antenna coupled to signal processing equipment and a power supply, comprising one or both of a battery and an external electrical supply, wherein, in a storage position, the signal processing equipment is positioned within the first compartment and the battery is positioned within the second compartment; and
further comprising an equipment rack comprising an equipment lift system coupled to a base in the first compartment, wherein the first compartment cover is coupled to a top of the equipment rack, and wherein the equipment lift system is adapted to move between a retracted position where the first compartment cover seals the first compartment opening and an extended position where the equipment rack extends through the first compartment opening above the top surface, and wherein the underground signal processing equipment is coupled to the equipment rack,
wherein the enclosure is adapted for in-ground installation.

13. The telecommunications base station of claim 12, further comprising a battery rack comprising a battery lift system coupled to a base in the second compartment, wherein the second compartment cover is coupled to a top of the battery rack, and wherein the battery lift system is adapted to move between a retracted position where the second compartment cover seals the second compartment opening and an extended position where the battery rack extends through the second compartment opening above the top surface and wherein the battery is coupled to the battery rack.

14. An enclosure for housing electrical components, comprising:
an outer shell;
a first compartment located within the outer shell;
an upper panel comprising a first compartment opening for accessing the first compartment;
a first compartment cover adapted for removably sealing the first compartment opening,
wherein sidewalls of the in-ground enclosure comprise an inner sidewall and an outer sidewall separated by a sidewall gap, wherein the sidewall gap is filled with a heat transfer particle, wherein a bulk density of the heat transfer particle in the sidewall gap is at least 75% of a density of the heat transfer particle, wherein the enclosure is adapted for in-ground installation.

15. The enclosure of claim 14, wherein the heat transfer particles are flakes.

16. The enclosure of claim 14, wherein the heat transfer particle comprises expanded graphite particles.

17. The enclosure of claim 14, wherein a base of the in-ground enclosure comprises an inner base and an outer base separated by a base gap, wherein the base gap is filled with heat transfer particles, wherein a bulk density of the heat transfer particle in the sidewall gap is at least 75% of a density of the heat transfer particle.

18. The enclosure of claim 17, wherein the heat transfer particles are flakes.

19. The enclosure of claim 17, wherein the heat transfer particles comprise expanded graphite particles.

* * * * *